(12) United States Patent
Kimikawa et al.

(10) Patent No.: US 6,980,493 B2
(45) Date of Patent: Dec. 27, 2005

(54) INFORMATION RECORDING MEDIUM CONVEYER

(75) Inventors: Yuichi Kimikawa, Saitama-ken (JP);
Nobutaka Kawakita, Saitama-ken (JP);
Katsunori Tamamura, Saitama-ken (JP); Hiroyuki Matsumoto, Saitama-ken (JP); Takao Yoshida, Saitama-ken (JP); Masashi Takano, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 335 days.

(21) Appl. No.: 10/427,988

(22) Filed: May 2, 2003

(65) Prior Publication Data

US 2003/0218945 A1 Nov. 27, 2003

(30) Foreign Application Priority Data

May 24, 2002 (JP) .............................. 2002-150682

(51) Int. Cl.⁷ ............................................ G11B 7/085

(52) U.S. Cl. .............................. 369/30.36; 369/53.37; 369/53.2; 369/53.22; 369/53.18

(58) Field of Search ...................... 369/30.36, 53.37, 369/53.2, 53.22, 53.18

(56) References Cited

U.S. PATENT DOCUMENTS 5,150,349 A 9/1992 Takai et al.
6,288,982 B1 * 9/2001 Kato ....................... 369/30.36

FOREIGN PATENT DOCUMENTS

| EP | 0 331 839 A2 | 9/1989 |
|---|---|---|
| EP | 0 944 069 A1 | 9/1999 |
| EP | 1 001 418 A1 | 5/2000 |
| JP | 62 008361 A | 1/1987 |
| JP | 62 143263 A | 6/1987 |
| JP | 04 105261 A | 4/1992 |
| JP | 09 219086 A | 8/1997 |

* cited by examiner

Primary Examiner—David Hudspeth
Assistant Examiner—Adam R. Giesy
(74) Attorney, Agent, or Firm—Arent Fox PLLC

(57) ABSTRACT

An information recording medium conveyer is provided, which provides countermeasures against power interruptions with high reliability. When a power interruption occurs during a loading operation with a conveying roller, the first unloading operation is initiated. When the outputs from detection sensors satisfy a predetermined condition during the first unloading operation, the process is initialized to cause the conveying roller to initiate a re-loading operation, thereby loading an information recording medium into a tray. On the other hand, when the outputs from the detection sensors do not change in accordance with a predetermined sequence during the re-loading operation, the process initiates the second unloading operation. When the detection sensors have detected the information recording medium during the second unloading operation and then the outputs from the detection sensors satisfy the predetermined condition, the process is initialized to cause the conveying roller to initiate another loading operation, thereby loading the information recording medium into the tray. Even when a power interruption occurs during an unloading operation, the same processing is performed to eject the information recording medium.

2 Claims, 15 Drawing Sheets

DIRECTION OF LOADING AND UNLOADING

DISC

FIG.5 A  t = t1
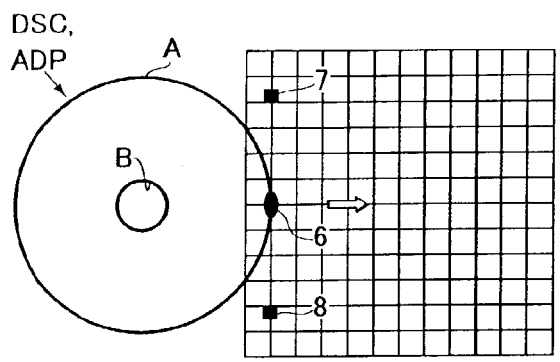
FIG.5 D  t = t4
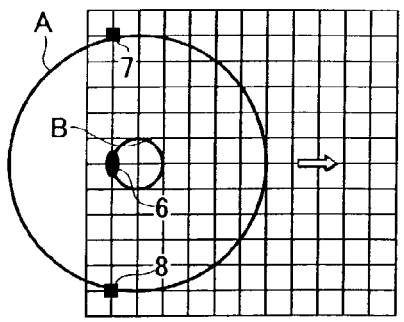
FIG.5 B  t = t2
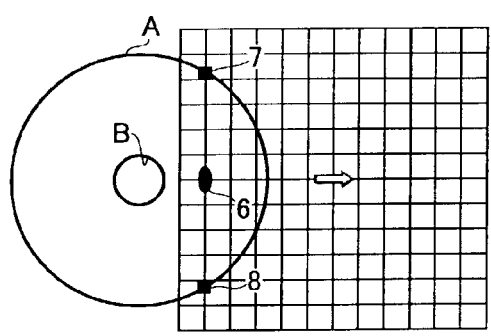
FIG.5 E  t = t5
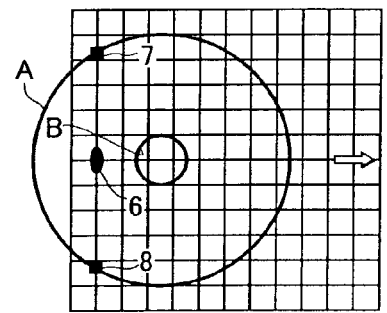
FIG.5 C  t = t3
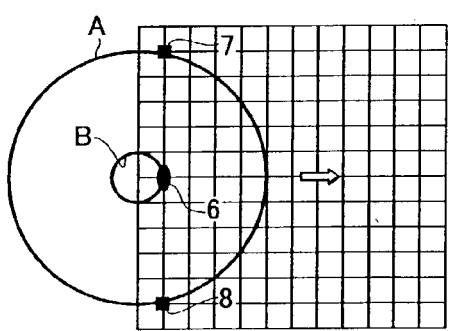
FIG.5 F  t = t6
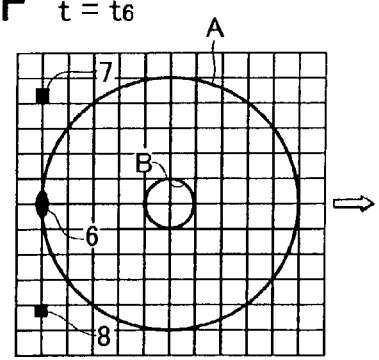
FIG.5 G
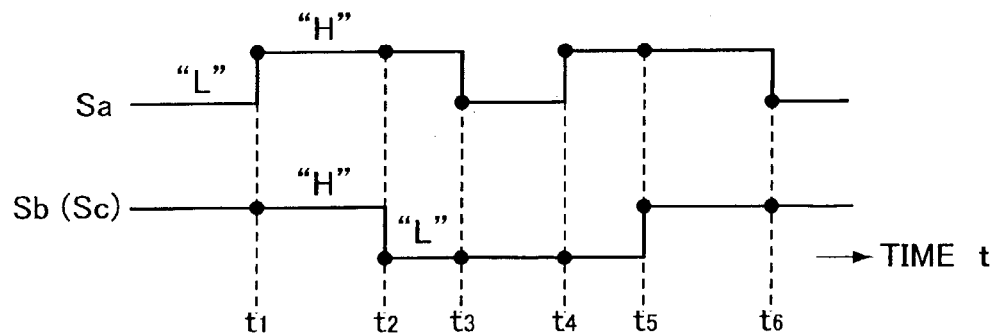

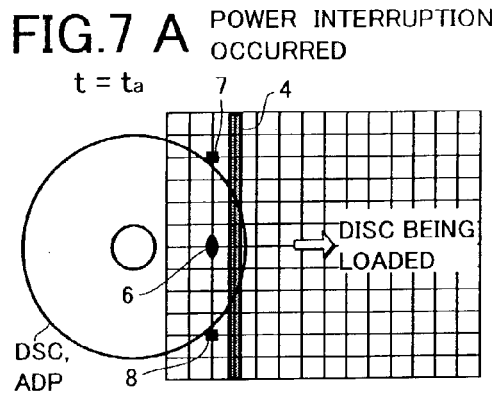# FIG.7 A POWER INTERRUPTION OCCURRED
t = ta

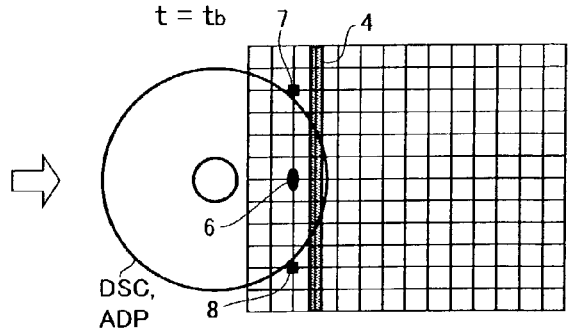# FIG.7 E DISC STOPPED TEMPORARILY AFTER UNLOADED(INITIALIZED)
t = tb

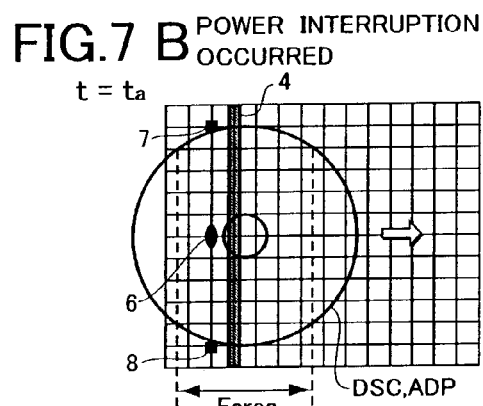# FIG.7 B POWER INTERRUPTION OCCURRED
t = ta

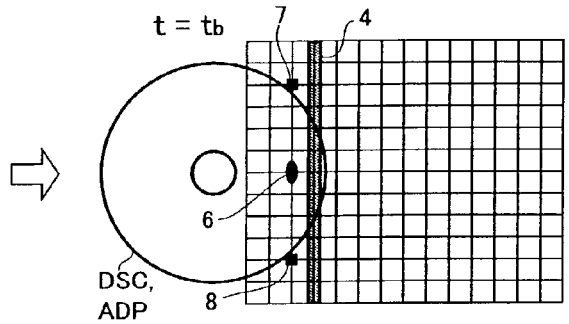# FIG.7 F DISC STOPPED TEMPORARILY AFTER UNLOADED(INITIALIZED)
t = tb

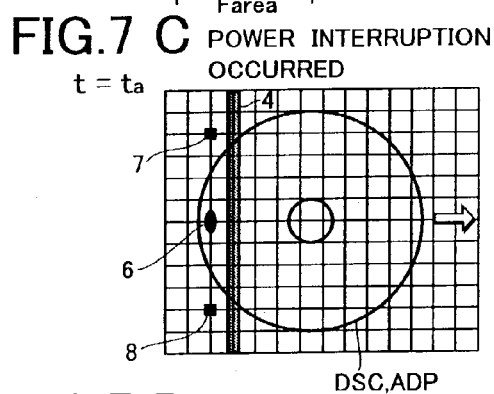# FIG.7 C POWER INTERRUPTION OCCURRED
t = ta

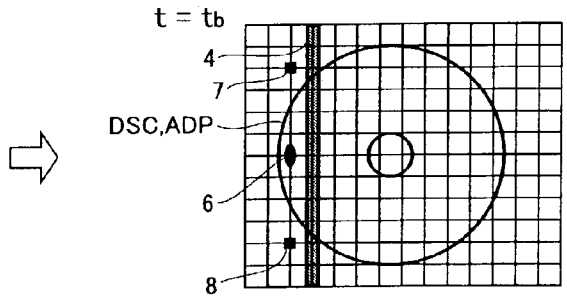# FIG.7 G DISC STOPPED TEMPORARILY AFTER UNLOADED(INITIALIZED)
t = tb

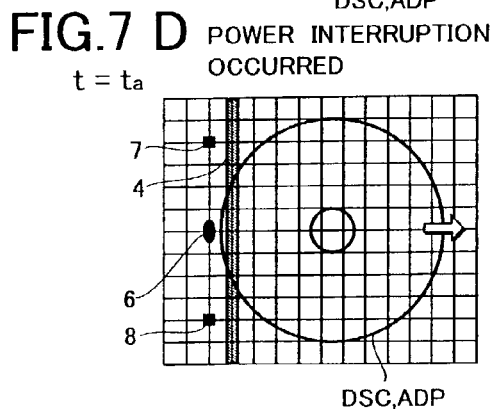# FIG.7 D POWER INTERRUPTION OCCURRED
t = ta

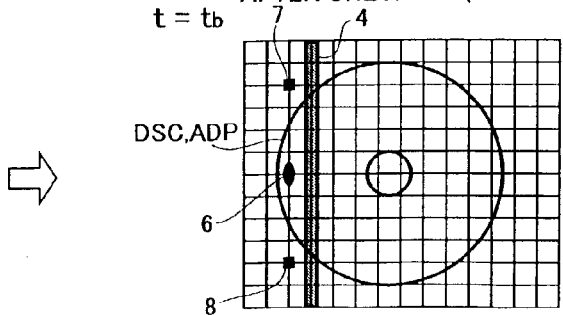# FIG.7 H DISC STOPPED TEMPORARILY AFTER UNLOADED(INITIALIZED)
t = tb

FIG. 8 A  INSERTION DETECTING SENSOR DETECTS NON-DISC FACE
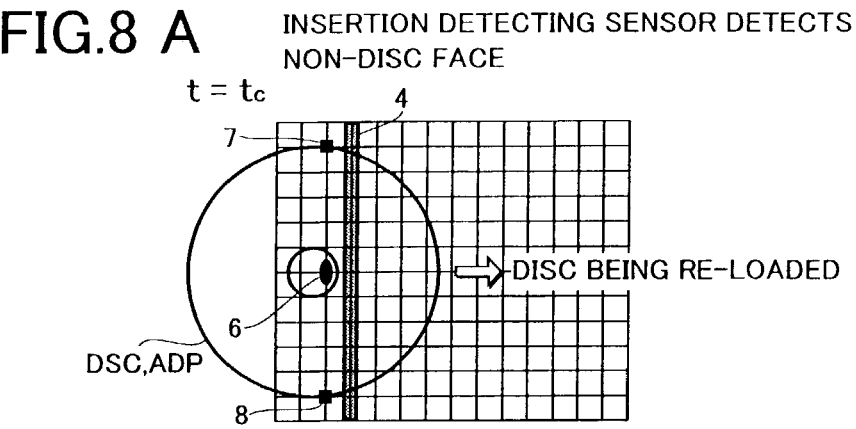
FIG. 8 B  INSERTION DETECTING SENSOR DETECTS NON-DISC FACE
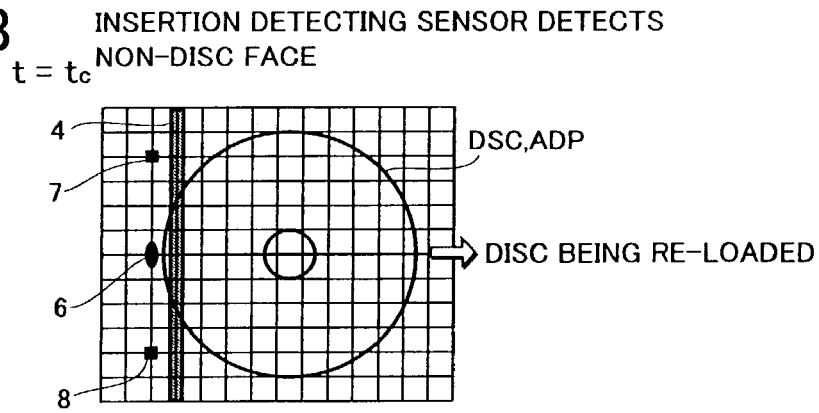
FIG. 8 C  OUTER-DIAMETER DETECTION SESORS DETECT DISC FACE DURING UNLOADING
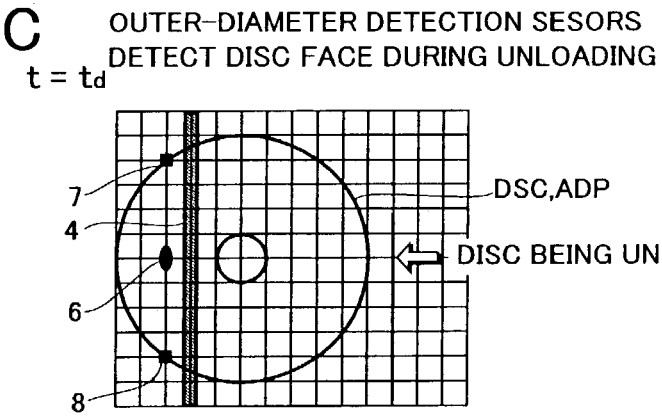
FIG. 8 D  OUTER-DIAMETER DETECTION SESORS DETECT NON-DISC FACE (INITIALIZED)
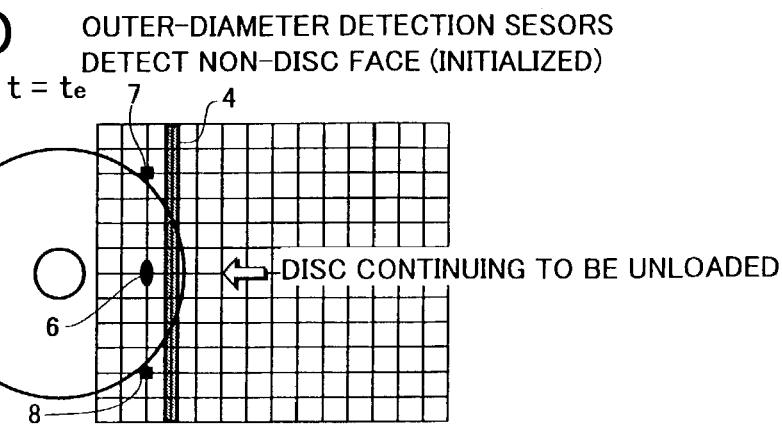

FIG.10 A POWER INTERRUPTION OCCURRED
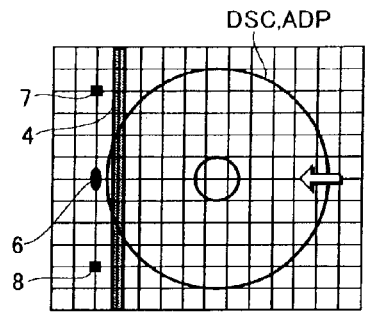

FIG.10 E DISC STOPPED TEMPORARILY AFTER UNLOADED(INITIALIZED)
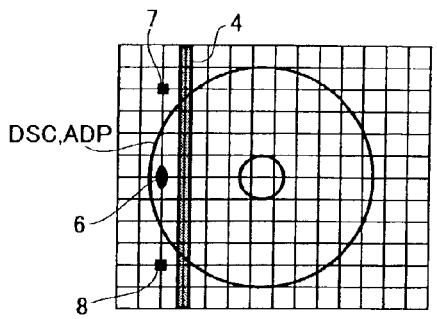

FIG.10 B POWER INTERRUPTION OCCURRED
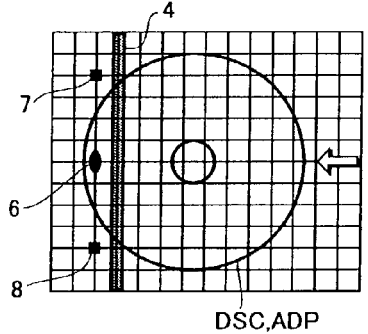

FIG.10 F DISC STOPPED TEMPORARILY AFTER UNLOADED(INITIALIZED)
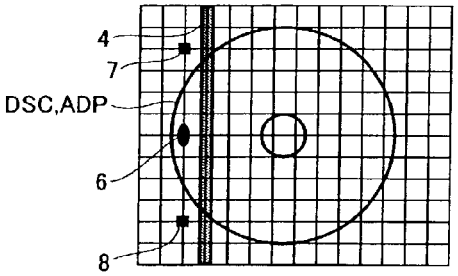

FIG.10 C POWER INTERRUPTION OCCURRED
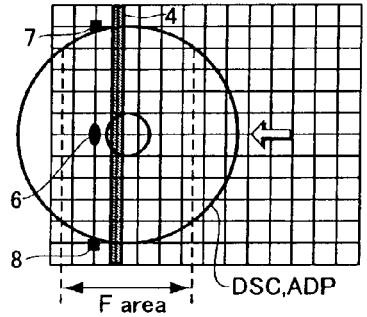

FIG.10 G DISC STOPPED TEMPORARILY AFTER UNLOADED(INITIALIZED)
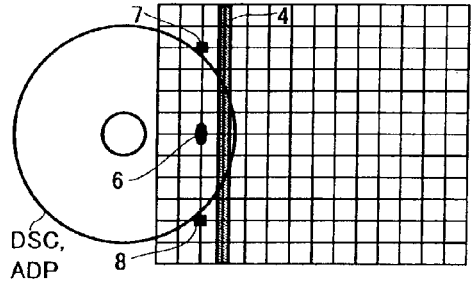

FIG.10 D POWER INTERRUPTION OCCURRED
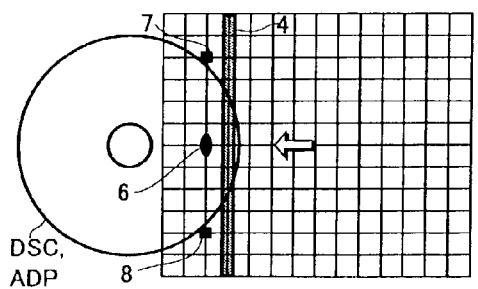

FIG.10 H DISC STOPPED TEMPORARILY AFTER UNLOADED(INITIALIZED)
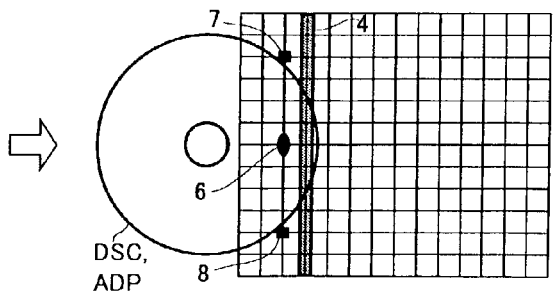

PRIOR ART  FIG.12 A
LARGE DISC
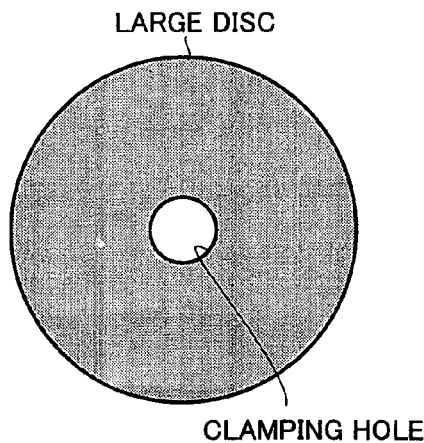
CLAMPING HOLE
PRIOR ART  FIG.12 B
SMALL DISC
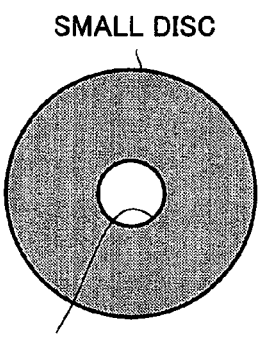
PRIOR ART  FIG.12 C
ADAPTER
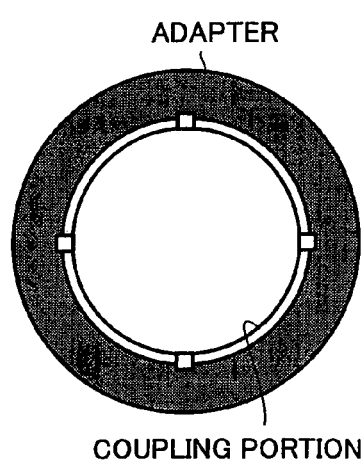
COUPLING PORTION
PRIOR ART  FIG.12 D
ADAPTER
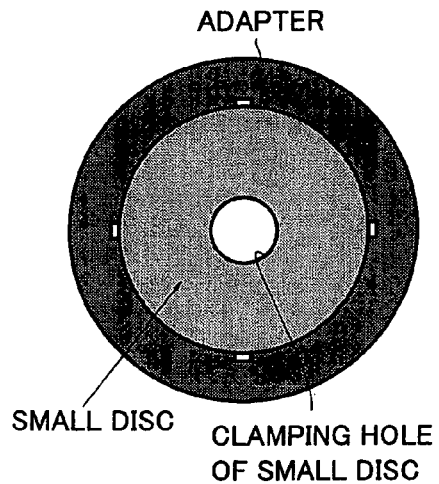
SMALL DISC   CLAMPING HOLE OF SMALL DISC
PRIOR ART  FIG.12 E
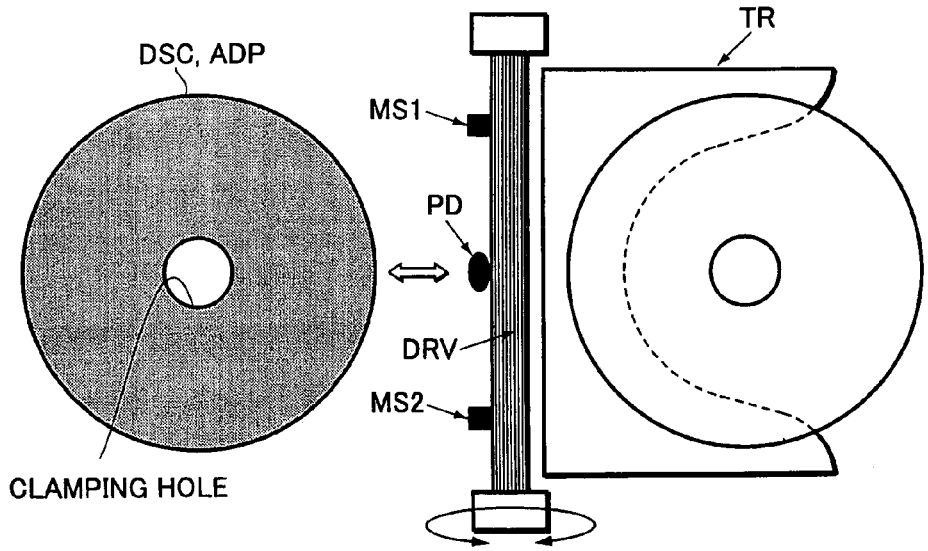
DSC, ADP
CLAMPING HOLE
MS1
PD
DRV
MS2
TR PRIOR ART FIG.13 A
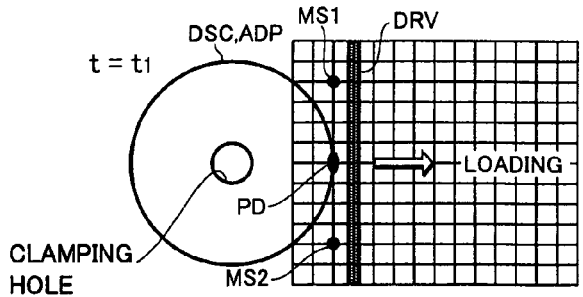
PRIOR ART FIG.13 B
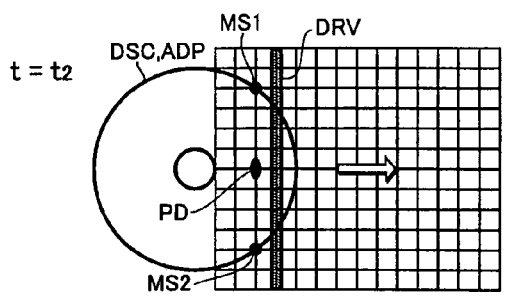
PRIOR ART FIG.13 C
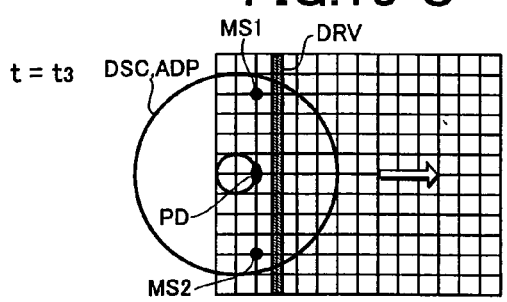
PRIOR ART FIG.13 D
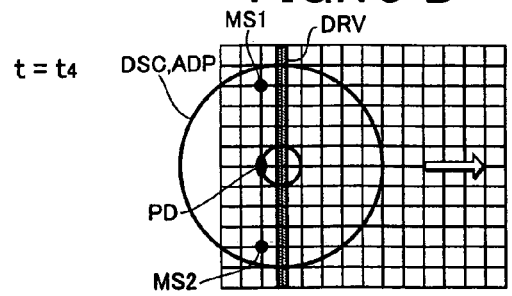
PRIOR ART FIG.13 E
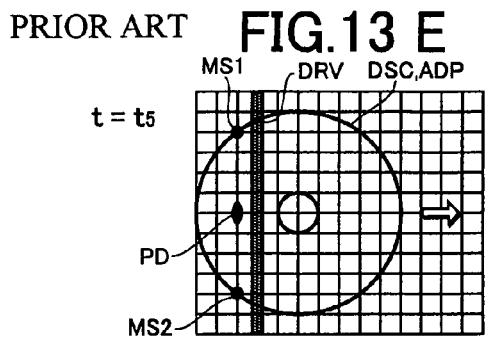
PRIOR ART FIG.13 F
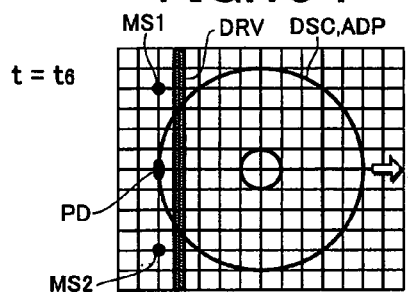
PRIOR ART FIG.13 G
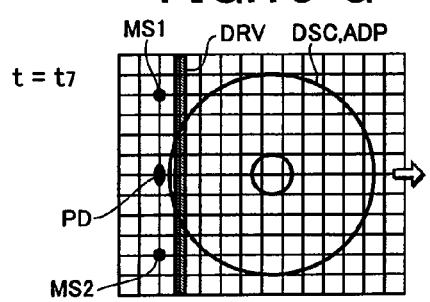
PRIOR ART FIG.13 H
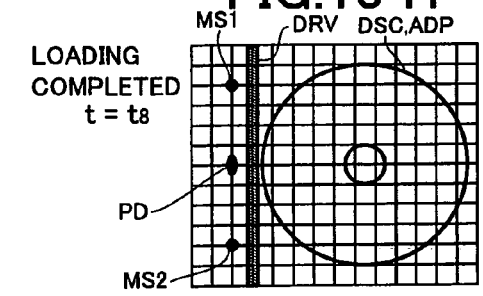
PRIOR ART FIG.13 I
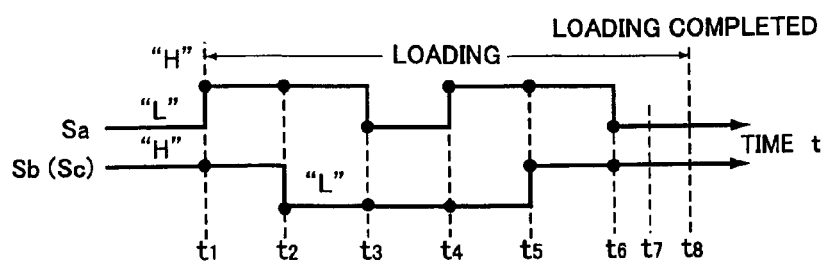

PRIOR ART

PRIOR ART  FIG.15 A
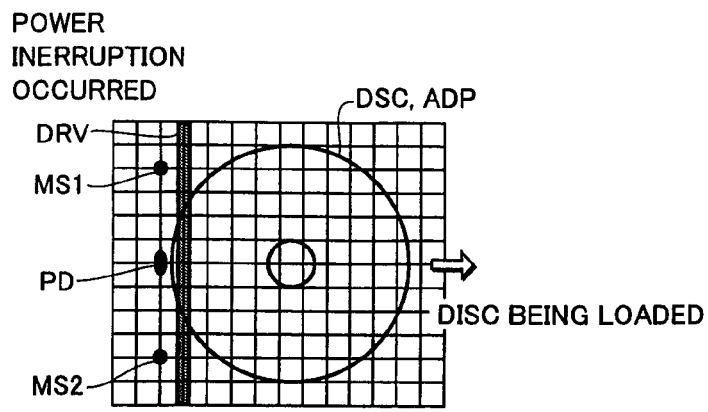
PRIOR ART  FIG.15 B
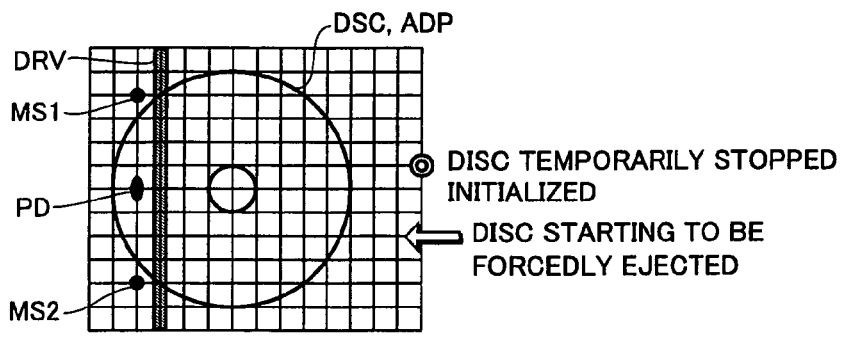
PRIOR ART  FIG.15 C
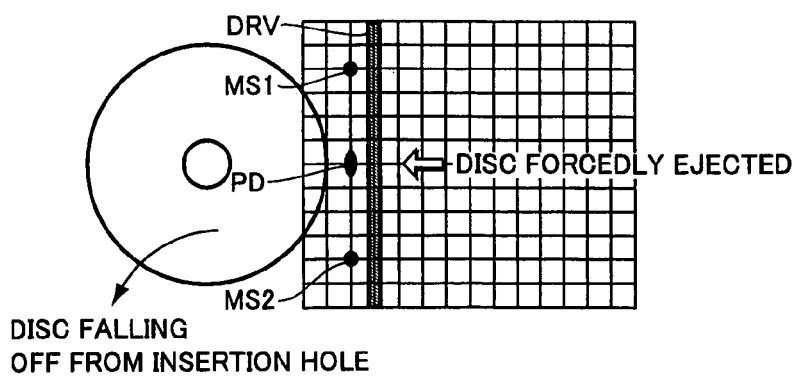

INFORMATION RECORDING MEDIUM CONVEYER

BACKGROUND OF THE INVENTION

The present invention relates to an information recording medium conveyer for conveying information recording media such as CDs (Compact Discs) or DVDs (Digital Versatile Discs) into or out of an information recording/reproducing device.

The present application claims priority from Japanese Application No. 2002-150682, the disclosure of which is incorporated herein by reference.

An information recording/reproducing device, such as a digital audio device, which utilizes CDs or DVDs (hereinafter collectively referred to simply as "discs") is conventionally known which includes a conveyer having a so-called auto-loading function for automatically loading a disc into or unloading it out of the information recording/reproducing device.

For these conveyers, since such discs as having a variety of shapes according to their specifications have come into wide use, it is critical to select only those discs which, when loaded, are available to the information recording/reproducing device, and to prevent those discs unavailable thereto or foreign objects from being loaded therein.

More specifically, standard CDs and DVDs are classified into two types: one having an outer diameter (or a diameter) of about 12 cm (hereinafter referred to as the "large disc") as shown in FIG. 12A and the other or a small disc having an outer diameter of about 8 cm as shown in FIG. 12B.

On the other hand, as shown in FIG. 12C, an additional annular member, called an adapter, has been developed which has an outer diameter of about 12 cm. The adapter is provided with a coupling portion having a circular hole at the center of the adapter to couple with a small disc. As shown in FIG. 12D, a small disc fitted into the coupling portion can serve as a quasi-disc (hereinafter referred to as the "adaptable disc") which conforms to the specification for the large disc.

For use with an information recording/reproducing device to which available are those large discs and adaptable discs which conform to the specification described above, it is critical to employ such an information recording medium conveyer which ensures that these discs are selected and other foreign objects rejected. A known information recording medium conveyer of this type is configured as shown in FIG. 12E.

Referring to FIG. 12E, the information recording medium conveyer includes a conveying roller DRV for conveying discs by means of a rotational force, three optical sensors PD, MS1, and MS2 for detecting the passage of discs, and a microprocessor (not shown) for controlling the rotation of the conveying roller DRV in response to detection signals Sa, Sb, and Sc output from the respective optical sensors PD, MS1, and MS2, respectively.

The optical sensor PD outputs the detection signal Sa, which takes on a logic "H" upon detecting the disc face of a large disc or an adaptable disc and a logic "L" upon detecting a portion other than the disc face of a large disc or an adaptable disc (portions other than the large disc or the adaptable disc) or a portion in a clamping hole through which a light beam passes.

The optical sensors MS1 and MS2 output the detection signals Sb and Sc, which take on the logic "L" upon detecting the disc face of a large disc or an adaptable disc and the logic "H" upon detecting a portion other than the disc face of a large disc or an adaptable disc.

When a large disc DSC or an adaptable disc ADP is inserted through an insertion hole (not shown), the aforementioned microprocessor checks each of the detection signals Sa, Sb, and Sc output from the optical sensors PD, MS1, and MS2. While checking whether the detection signals Sa, Sb, and Sc have changed in accordance with a predetermined sequence, the microprocessor controls the rotation of the conveying roller DRV to load the disc into a tray TR provided at a so-called clamp position behind the conveying roller DRV.

FIGS. 13A to 13H show changes in the position of movement of the large disc DSC or an adaptable disc ADP with respect to the optical sensors PD, MS1, and MS2 and FIG. 13I shows corresponding changes in the level of the detection signals Sa, Sb, and Sc, the changes being provided when the disc DSC or ADP is loaded towards the tray TR.

As shown in FIG. 13A, when the disc DSC or ADP is inserted and then detected at its leading edge with the optical sensor PD, the conveying roller DRV is activated to rotate in the forward direction and start loading the disc DSC or ADP towards the tray TR.

The conveying roller DRV then exerts a rotational force on the disc DSC or ADP, which is in turn loaded as shown in FIGS. 13B to 13G. Accordingly, this causes the detection signals Sa, Sb, and Sc to change in accordance with the predetermined sequence shown by points in time t1 to t7 in FIG. 13I. In this case, the microprocessor determines the loading operation is carried out in accordance with a normal sequence, and thus allows the loading operation to continue so that the disc DSC or ADP is finally loaded into the tray TR as shown in FIG. 13H.

On the other hand, for the detection signals Sa, Sb, and Sc which have not changed in accordance with the predetermined sequence during the loading operation, the microprocessor recognizes the abnormal change in the course of the loading operation and determines that a foreign object has been inserted, thus allowing the conveying roller DRV to rotate in the reverse direction to thereby forcedly eject the foreign object through the insertion hole.

In addition to cases where a foreign object is inserted into the apparatus, a case where the source voltage supplied from a power source unit drops momentarily below its rating exists as an inevitable problem caused by the information recording/reproducing device or the information recording medium conveyer itself. However, the apparatus is provided with a function for preventing malfunctions and automatically restoring it to a proper loading operation even when such a power interruption has occurred.

More specifically, for an information recording/reproducing device mounted in an automobile, a power interruption may occur at the start of the engine while the information recording medium conveyer is loading a disc DSC or ADP, leading to degradation in reliability of the determination processing which has been performed by the aforementioned microprocessor immediately before the occurrence of the power interruption.

Even when such a power interruption has occurred, the microprocessor serves to automatically restore its reliability, thereby preventing unnecessary troubles.

FIGS. 14A to 14F show a restoring operation performed when a power interruption has occurred during the loading operation.

For example, as shown in FIG. 14A, suppose that a power interruption has occurred at a point in time ta while a disc is being loaded. In this case, the microprocessor causes the conveying roller DRV to rotate in the reverse direction to forcedly unload the disc being loaded towards the insertion hole as shown in FIG. 14B.

Then, as shown in FIG. 14C, when the trailing edge of the disc face of the disc being unloaded has passed by the optical sensors MS1 and MS2, the detection signals Sb and Sc invert from the logic "L" to the logic "H." On the condition that the detection signals Sb and Sc have taken on the logic "H," the microprocessor causes the conveying roller DRV to temporarily stop (at a point in time tc) and hold the disc, thereby preventing the disc from falling from the insertion hole.

Then, when the microprocessor determines that all the detection signals Sa, Sb, and Sc have taken on the logic "H" during the temporary stop or at the point in time tc in FIG. 14F, the process determines that the power interruption has been recovered and the process is then initialized in a predetermined manner.

That is, the detection signals Sa, Sb, and Sc all having the logic "H" (at the point in time tc) indicate that the same condition as that during the period from t1 to t2 in FIG. 13I has been obtained. This condition obtained allows the process to determine that the disc DSC or ADP has returned to a position at which the loading operation can be properly restarted and to be initialized to proceed to the normal loading operation.

After having been completely initialized, the process allows the conveying roller DRV to rotate in the forward direction to start the re-loading operation.

Starting and continuing the re-loading operation as such causes the detection signals Sa, Sb, and Sc to change at the point in time td in FIG. 14D in the same manner as at the point in time t2 in FIG. 13B. Continuing further the re-loading operation causes the detection signals Sa, Sb, and Sc to change at the point in time te in FIG. 14E in the same manner as at the point in time t3 in FIG. 13C.

Accordingly, when the detection signals Sa, Sb, and Sc change after the point in time td in FIG. 14F in the same sequence as the signals change after the point in time t2 in FIG. 13I, the microprocessor determines that the loading operation has been carried out in the normal sequence and then causes the disc DSC or ADP to be finally loaded into the tray TR.

Although not specifically described, suppose that a power interruption has occurred while the disc DSC or ADP placed in the tray TR is being unloaded. Even in this case, the same restoring processing as that performed when a power interruption occurs during the loading operation is carried out to eject from the insertion hole the disc DSC or ADP being unloaded.

As described above, the conventional information recording medium conveyer has the improved operability achieved by automatically loading or unloading an authorized disc and the improved reliability achieved by allowing the apparatus to automatically recover even from an inevitable power interruption and then continue the loading or unloading operation.

The aforementioned power interruption occurs unexpectedly and inevitably. However, there is a need for the development of a more reliable information recording medium conveyer which can prevent unnecessary troubles although inevitable.

In order to develop a more reliable information recording medium conveyer, the present inventor has studied in detail the contents of countermeasures which have been taken against power interruptions in the conventional information recording medium conveyer, and found the following problems.

A specific example of the problems to be solved will be explained below with reference to FIGS. 15A to 15C. First, as shown in FIG. 15A, suppose that a power interruption has occurred at a point in time during a loading operation, which has caused the conveying roller DRV to stop during its rotation and thereby caused the trailing edge of the disc face of the disc DSC or ADP to stay at the position of the conveying roller DRV (if there is not such a power interruption, the disc DSC or ADP will be loaded into the tray TR in the normal condition).

In other words, suppose that the power interruption has occurred when the disc face of the disc DSC or ADP has just passed by all the optical sensors PD, MS1, and MS2.

In this case, in the conventional information recording medium conveyer, the microprocessor allows the conveying roller DRV to rotate in the reverse direction to thereby initiate the unloading operation. Then, as shown in FIG. 15B, on the condition that the trailing edge of the disc face of the disc DSC or ADP being unloaded has passed by the optical sensors MS1, and MS2 and the detection signals Sb and Sc have taken on the logic "H," the microprocessor causes the conveying roller DRV to temporarily stop rotating and the process to be initialized as described above.

However, in the situation shown in FIG. 15B, most part of the disc face of the disc DSC or ADP is found on the tray side with respect to the optical sensors PD, MS1, and MS2. This is clearly different from the situation shown in FIG. 14C in which most part of the disc face of the disc DSC or ADP is found on the insertion hole side with respect to the optical sensors PD, MS1, and MS2.

As described above, the disc DSC or ADP is located at a different position with respect to the optical sensors PD, MS1, and MS2. When the process is initialized as described above under this situation and the re-loading operation is initiated after the process has been initialized, it is not possible to obtain the same normal sequence as that after the point in time td (t2) in FIG. 14F.

For this reason, in the situation as shown in FIG. 15B, while even an authorized disc DSC or ADP is being actually reloaded, the microprocessor determines that a foreign object has been inserted and thus causes the conveying roller DRV to rotate in the reverse direction again, thereby starting to perform a forced eject operation.

When the forced eject operation is performed even on an authorized disc DSC or ADP as described above, the disc DSC or ADP is ejected from the insertion hole as shown in FIG. 15C, presumably resulting in a situation where the disc DSC or ADP is fallen from the information recording/reproducing device unless the user holds it.

In this context, as shown in FIGS. 14C and 15B, such a case is expected in which the disc DSC or ADP may be located at different positions with respect to the optical sensors PD, MS1, and MS2 (when initializing the process) depending on at which point in time of the loading operation a power interruption occurs. Accordingly, even with the disc DSC or ADP located at different positions, it is presumably necessary to ensure that the disc can be reloaded with high reliability.

FIGS. 15A to 15C show a problem to be solved with a power interruption which has occurred when the disc face of the disc DSC or ADP has just passed by all the optical sensors PD, MS1, and MS2 during the loading operation. On the other hand, where a power interruption has occurred when the disc face of the disc DSC or ADP has just passed by all the optical sensors PD, MS1, and MS2 during the unloading operation, it is presumably necessary to ensure that the disc can be unloaded with high reliability.

SUMMARY OF THE INVENTION

The present invention has been developed in view of these problems. It is therefore an object of the present invention to provide an information recording medium conveyer which provides countermeasures against a power interruption with higher reliability.

According to a first aspect of the present invention, there is provided an information recording medium conveyer for conveying a disc-shaped information recording medium. The apparatus includes transport device for conveying the information recording medium in both backward and forward directions, first detecting device for detecting a travel track on a center axis line of the information recording medium conveyed by the transport device, second detecting device for detecting a travel track of a portion separated by a predetermined distance from the center axis line of the information recording medium conveyed by the transport device, and control device for initializing a loading operation performed by the transport device on a condition that an output of the first detecting device and the second detecting device provides a predetermined value and for causing the loading operation to continue when the output of the first and second detecting device changes in accordance with a predetermined sequence upon the loading operation after having been initialized. The aforementioned control device performs the steps of allowing the transport device to initiate a first unloading operation when a power interruption occurs during a loading operation performed by the transport device, allowing the transport device to be initialized and initiate a re-loading operation when an output of the first and second detecting device satisfies the condition during the first unloading operation, allowing the re-loading operation to continue when the output of the first and second detecting device changes in accordance with the predetermined sequence during the re-loading operation, allowing a second unloading operation to be initiated when the output of the first and second detecting device does not change in accordance with the predetermined sequence during the re-loading operation, allowing the transport device to be initialized and initiate another loading operation when the output of the first and second detecting device satisfies the condition after the second detecting device has detected the information recording medium during the second unloading operation, and allowing the another loading operation to continue when the output of the first and second detecting device changes in accordance with the predetermined sequence during the another loading operation.

According to the information recording medium conveyer of the present invention, first, the transport device initiates a first unloading operation when a power interruption occurs during a loading operation.

When an output of the first and second detecting device satisfies the predetermined condition during the first unloading operation, the transport device is initialized to initiate a re-loading operation.

When the output of the first and second detecting device changes in accordance with the predetermined sequence during the re-loading operation, the re-loading operation continues to perform the so-called normal loading operation recovered from the power interruption.

On the other hand, when the output of the first and second detecting device does not change in accordance with the predetermined sequence during the re-loading operation, a second unloading operation is initiated.

The transport device is initialized to initiate another loading operation when the output of the first and second detecting device satisfies the predetermined condition after the second detecting device has detected the information recording medium during the second unloading operation.

When the output of the first and second detecting device changes in accordance with the predetermined sequence during the another loading operation, the another loading operation continues to perform the so-called normal loading operation recovered from the power interruption.

As described above, when a power interruption occurs during a loading operation and the process is initialized for the first time to unsuccessfully recover from the power interruption, the transport device is controlled to convey the information recording medium to a position at which the positional relationship between the information recording medium and the first and second detecting device satisfies the condition for initializing the process, thereby making it possible to initialize the process successfully for the second time and restore a proper loading operation.

According to a second aspect of the invention, there is provided an information recording medium conveyer for conveying a disc-shaped information recording medium. The apparatus includes transport device for conveying the information recording medium in both backward and forward directions, first detecting device for detecting a travel track on a center axis line of the information recording medium conveyed by the transport device, second detecting device for detecting a travel track of a portion separated by a predetermined distance from the center axis line of the information recording medium conveyed by the transport device, and control device for initializing an unloading operation performed by the transport device on a condition that an output of the first detecting device and the second detecting device provides a predetermined value and for causing the unloading operation to continue when the output of the first and second detecting device changes in accordance with a predetermined sequence upon the unloading operation after having been initialized. The aforementioned control device performs the steps of allowing the transport device to continue the unloading operation when a power interruption occurs during the unloading operation performed by the transport device, allowing the transport device to be initialized and initiate a first loading operation when an output of the first and second detecting device satisfies the condition during the unloading operation, allowing the transport device to initiate a re-unloading operation when the output of the first and second detecting device changes in accordance with the predetermined sequence during the first loading operation, allowing an unloading operation to be initiated when the output of the first and second detecting device does not change in accordance with the predetermined sequence during the first loading operation, allowing the transport device to be initialized and initiate a second loading operation when the output of the first and second detecting device satisfies the condition during the unloading operation, allowing the transport device to initiate another unloading operation when the output of the first and second detecting device changes in accordance with the predetermined sequence during the second loading operation, and allowing the another unloading operation to continue when the output of the first and second detecting device changes in accordance with the predetermined sequence during the another unloading operation.

According to the information recording medium conveyer of the present invention, first, the transport device continues an unloading operation when a power interruption occurs during the unloading operation.

When an output of the first and second detecting device satisfies the predetermined condition during the unloading operation, the transport device is initialized to initiate a first loading operation.

When the output of the first and second detecting device changes in accordance with the predetermined sequence during the first loading operation, the transport device initiates a re-unloading operation.

On the other hand, when the output of the first and second detecting device does not change in accordance with the predetermined sequence during the first loading operation, an unloading operation is initiated, while the transport device is initialized to initiate a second loading operation when the output of the first and second detecting device occurs and satisfies the predetermined condition during the unloading operation.

The transport device initiates another unloading operation when the output of the first and second detecting device changes in accordance with the predetermined sequence during the second loading operation, while the another unloading operation continues when the output of the first and second detecting device changes in accordance with the predetermined sequence during the another unloading operation.

As described above, when a power interruption occurs during an unloading operation and the process is initialized for the first time to unsuccessfully recover from the power interruption, the transport device is controlled to convey the information recording medium to a position at which the positional relationship between the information recording medium and the first and second detecting device satisfies the condition for initializing the process, thereby making it possible to initialize the process successfully for the second time and restore a proper unloading operation.

BRIEF DESCRIPTION OF THE DRAWINGS

These and other objects and advantages of the present invention will become clear from the following description with reference to the accompanying drawings, wherein:

FIGS. 5A to 5G show the positional relationship between a large disc or an adaptable disc and each detection sensor, and each detection signal at the time of a loading operation;

FIGS. 7A to 7H show the positional relationship between a large disc or an adaptable disc to be loaded upon power interruption processing and each detection sensor;

FIGS. 8A to 8D further show the positional relationship between a large disc or an adaptable disc to be loaded upon power interruption processing and each detection sensor;

FIGS. 10A to 10H show the positional relationship between a large disc or an adaptable disc to be unloaded upon power interruption processing and each detection sensor;

FIGS. 12A to 12E show the configuration of components incorporated into a conventional information recording medium conveyer;

FIGS. 13A to 13I show, in explanatory views, the operation of the conventional information recording medium conveyer;

FIGS. 15A to 15C show, in explanatory views, problems expected with the conventional information recording medium conveyer which may occur upon occurrence of a power interruption.

DETAILED DESCRIPTION OF THE PREFERRED EMBODIMENTS

Figure 1:
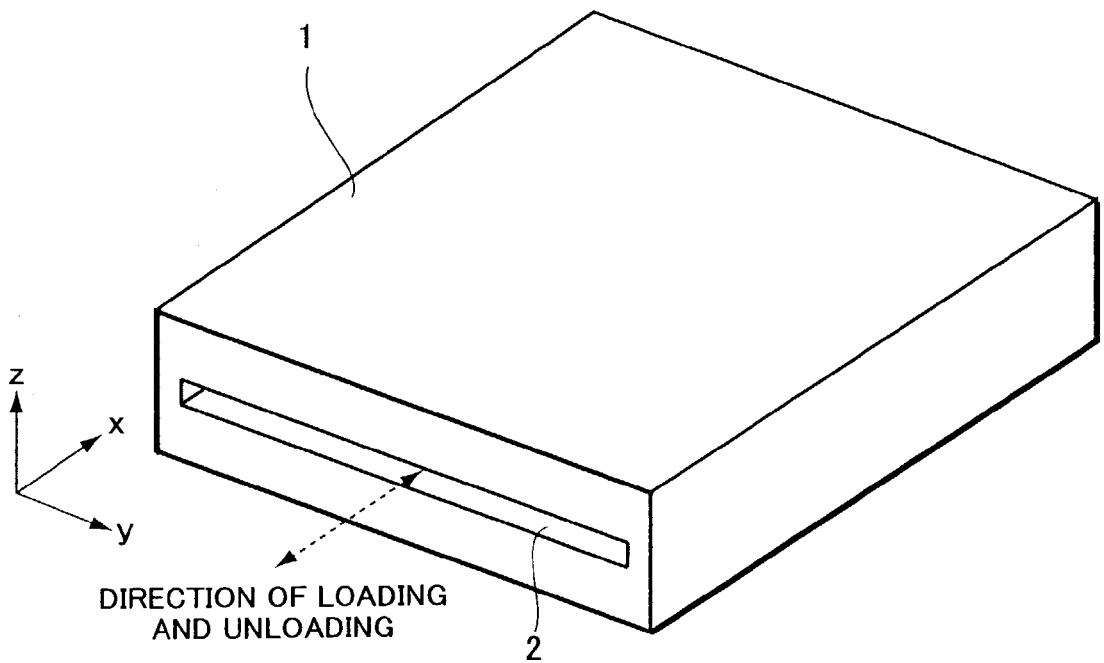
FIGS. 1A and 1B show the structure and configuration of an information recording medium conveyer according to an embodiment.
Figure 1:
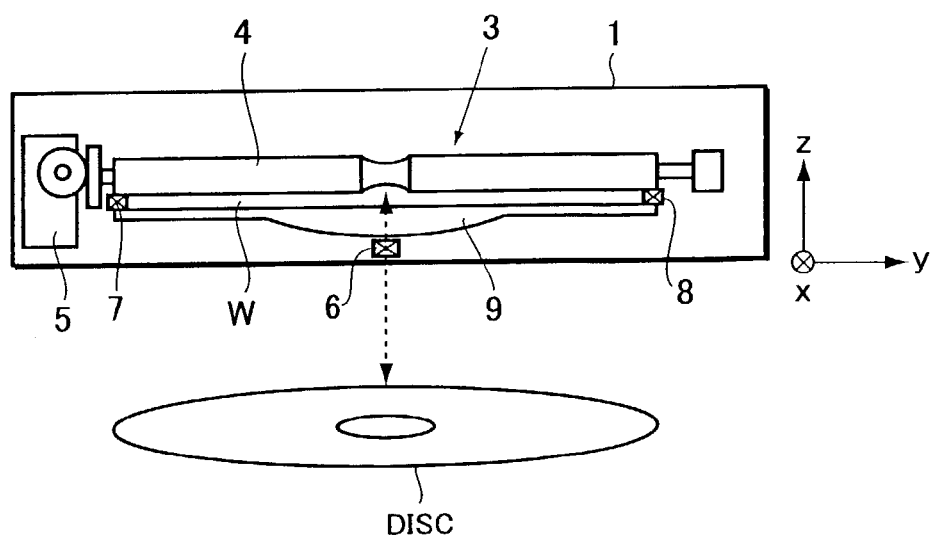
Figure 2:
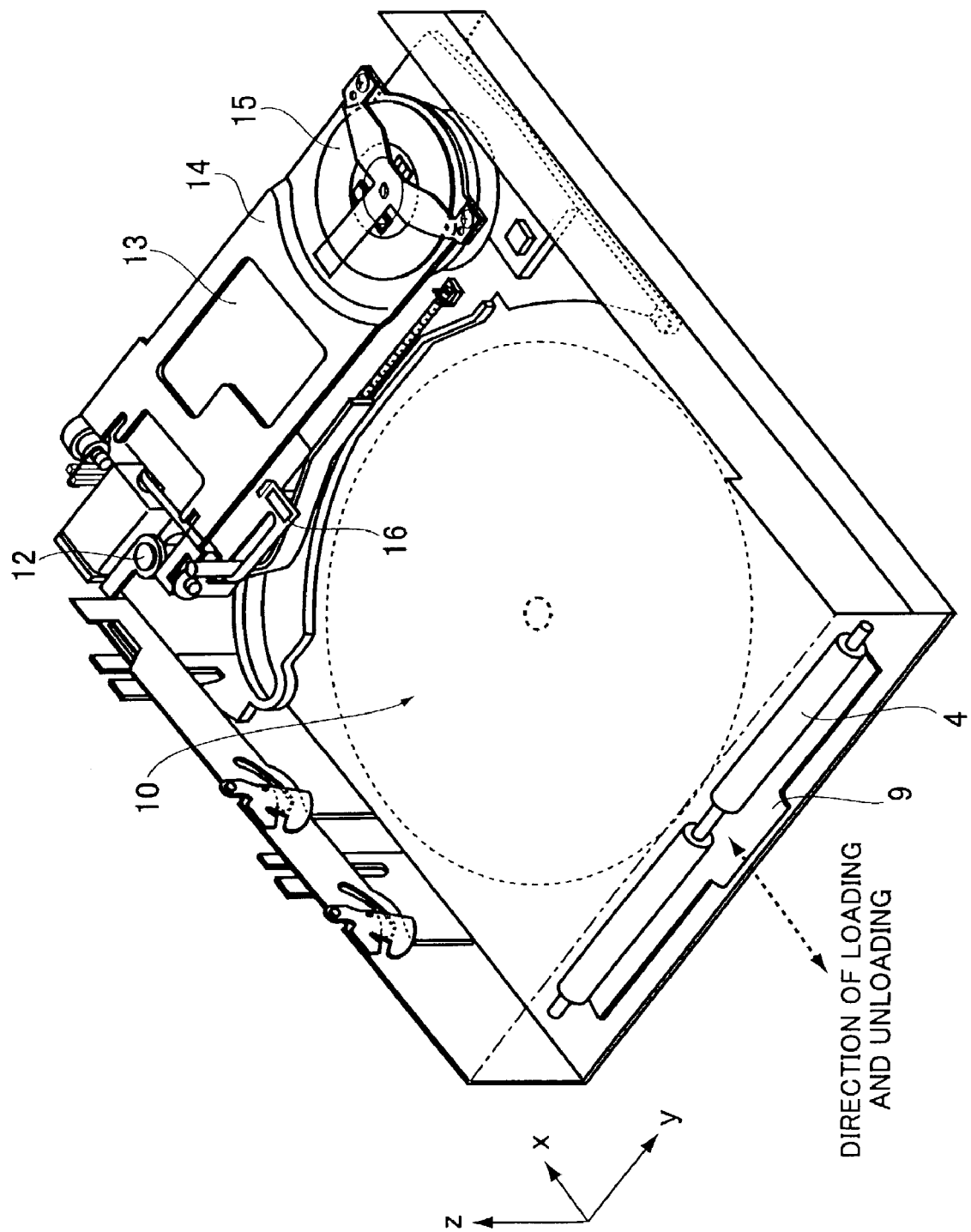
FIG. 2 is a perspective view showing the internal configuration of an information recording/reproducing device incorporating the information recording medium conveyer according to the embodiment.
Figure 3:
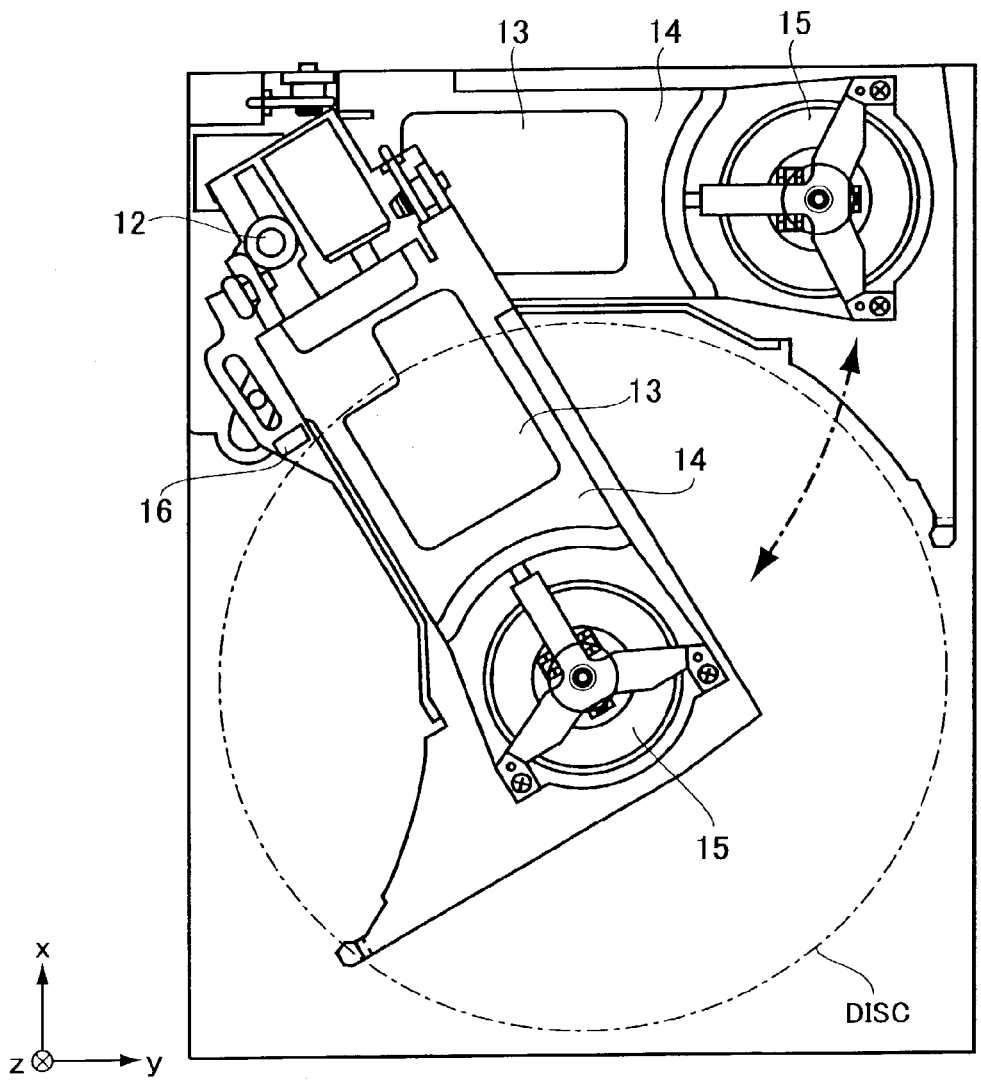
FIGS. 3A and 3B further show the internal configuration of the information recording/reproducing device.
Figure 3:
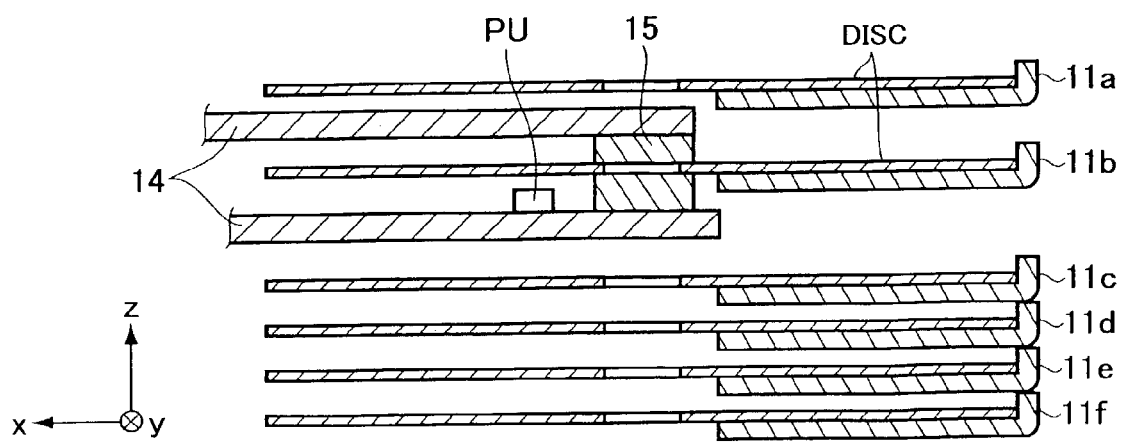

Now, the present invention will be described below with reference to the accompanying drawings in accordance with preferred embodiment. FIGS. 1A and 1B are a view showing the outer appearance of an information recording/reproducing device equipped with an information recording medium conveyer according to the present embodiment, and a schematic view of the configuration of the information recording medium conveyer, respectively. FIG. 2 is a perspective view showing the internal configuration of the information recording/reproducing device. FIGS. 3A and 3B are explanatory views showing the internal configuration and operation of the information recording/reproducing device.

Referring to FIG. 1A, the information recording/reproducing device 1 has been developed as a component to be selectively incorporated into an automobile audio system or the like. The device 1 is adapted to utilize discs such as CDs and DVDs having an outer diameter of about 12 cm (large discs) which conform to their standards and quasi-discs (adaptable discs) which are each realized by attaching an annular adapter having an outer diameter of about 12 cm to a small-diameter CD having an outer diameter of about 8 cm.

For convenience in description, the large disc and the adaptable disc is simply referred to as a "disc." Additionally, the portion of the disc other than the clamping hole is called the "disc face." On the other hand, the clamping hole and the portion other than the disc, or the portions other than the disc face, are called the non-disc face.

On the front side of the information recording/reproducing device 1, there is provided a slit-shaped insertion hole 2 for allowing a large disc and an adaptable disc (or the disc) to be inserted therethrough. The insertion hole 2 is formed in the shape of a slit which is slightly larger than the disc in thickness and outer diameter.

Inserting the disc into the insertion hole 2 will cause an information recording medium conveyer 3 to convey the disc into the device 1. A foreign object inserted into the insertion hole 2 would cause the information recording medium conveyer 3 to identify it and then eject it through the insertion hole 2. The insertion hole 2 also serves as an eject slot for ejecting (unloading) a used disc therethrough out of the information recording/reproducing device 1.

Now, referring to FIG. 1B, the information recording medium conveyer 3 includes a conveying roller 4 serving as transport device disposed orthogonal to the loading and unloading direction (the x direction), a drive motor 5 for rotationally driving the conveying roller 4 flexibly in the forward and reverse directions via a gear mechanism (not indicated by a reference number), and an insertion detecting sensor 6 serving as first detecting device formed of an optical sensor provided at the center of the conveying roller 4. The apparatus 3 further includes outer-diameter detection sensors 7 and 8 for serving as second detecting device which are each formed of a mechanical microswitch placed near their respective ends of the conveying roller 4 in the direction of its length (the y direction), and thus spaced apart from each other by a predetermined distance. The apparatus 3 also includes a plate-shaped guide member 9 which is disposed opposite to the roller surface of the conveying roller 4 with a small gap W provided therebetween.

The conveying roller 4 and the guide member 9 are disposed behind the insertion hole 2 (inside the device 1), with the small gap W between the conveying roller 4 and the guide member 9 disposed opposite to the insertion hole 2.

A user inserts a desired disc from outside into the device 1 through the insertion hole 2. This causes the guide member 9 to guide the disc into the small gap W, and the conveying roller 4 to rotate in the forward direction and exert a drive force on the disc, which is in turn loaded into the device 1 while being sandwiched between the roller surface and the guide member 9.

On the other hand, the insertion detecting sensor 6 is positioned at the center of the length of the conveying roller 4 (in the y direction) and slightly closer to the insertion hole 2 than the small gap W between the conveying roller 4 and the guide member 9.

Accordingly, a disc inserted into the device through the insertion hole 2 can be first detected at the leading edge of the disc face thereof by means of the insertion detecting sensor 6.

On the other hand, the outer-diameter detection sensors 7 and 8 each formed of a microswitch are disposed substantially in a line orthogonal to the loading and unloading direction (the x direction) with the insertion detecting sensor 6 at their center.

In other words, the insertion detecting sensor 6 and the outer-diameter detection sensors 7 and 8 are disposed to be generally parallel to the conveying roller 4 as well as to the aforementioned small gap W.

In the vicinity of both ends of the conveying roller 4, there are provided a resiliently biasing mechanism (not shown) for supporting the outer-diameter detection sensors 7 and 8, respectively.

The resiliently biasing mechanism includes a resilient spring or the like for exerting a spring force all the time on the outer-diameter detection sensors 7 and 8 towards the insertion detecting sensor 6. This arrangement allows the outer-diameter detection sensors 7 and 8 to move retractably towards the insertion detecting sensor 6 within the expandable and contractible range of the resilient spring.

The outer-diameter detection sensors 7 and 8 are each spaced apart by a predetermined distance from the insertion detecting sensor 6 disposed at their center. In other words, any distance which is larger than the radius of the small disc having an outer diameter of about 8 cm and less than that of the large disc having an outer diameter of about 12 cm is determined as the separation between the insertion detecting sensor 6 and the outer-diameter detection sensor 7 and between the insertion detecting sensor 6 and the outer-diameter detection sensor 8.

In this arrangement, a disc is inserted and passes between the outer-diameter detection sensors 7 and 8 with the outer circumference portion of the disc in sliding contact with the outer-diameter detection sensors 7 and 8. Thus, the disc passes between the outer-diameter detection sensors 7 and 8 while expanding the separation therebetween against the biasing force of the aforementioned resilient spring. The sliding contact mentioned above causes the outer-diameter detection sensors 7 and 8 to be turned ON at the same time, thereby detecting the passage of the disc.

When the disc passes between the outer-diameter detection sensors 7 and 8, the aforementioned biasing force causes the disc to be held with the insertion detecting sensor 6 at their center. Accordingly, the aforementioned resiliently biasing mechanism enables the insertion detecting sensor 6 to sense the travel track on the center axis line of the disc in motion and contributes to an improvement in identifying discs by a system controller 17, discussed later.

Now, referring to FIG. 2, at a central portion 10 of the information recording/reproducing device 1, there is provided a disc changer mechanism into which a plurality of large discs or adaptable discs can be loaded.

As shown in the longitudinal cross-sectional schematic view shown in FIG. 3B, the disc changer mechanism includes a plurality of trays 11a to 11f each accommodating individual discs and an elevator mechanism (not shown) for raising and lowering the trays 11a to 11f in the vertical direction (or the z direction).

When the information recording medium conveyer 3 loads a disc, the elevator mechanism first allows an empty tray to register in height against the small gap W between the conveying roller 4 and the guide member 9, and then the information recording medium conveyer 3 loads the disc into the empty tray. Thus, authorized discs are placed in the trays.

On the other hand, when the information recording medium conveyer 3 unloads a disc, the elevator mechanism first allows the tray carrying the disc to register in height against the gap W, and then the information recording medium conveyer 3 unloads the disc from the tray to eject it through the insertion hole 2.

Additionally, behind the disc changer mechanism, there is provided a pickup mechanism 13 which can rotate about a support shaft 12.

That is, as shown in the plan view shown in FIG. 3A, the pickup mechanism 13 pivots towards the clamping portion of discs placed in the trays 11a to 11f provided in the disc changer mechanism and is provided, at an end of a metallic arm portion 14 supported by the support shaft 12, with a clamping mechanism 15 which pivotally sandwiches the disc clamping portion.

The clamping mechanism 15 is provided with a motor (not shown) for rotating the sandwiched disc at a constant linear speed in a predetermined direction, while the arm portion 14 is provided with a carriage mechanism (not shown) for moving retractably an optical pickup PU facing the recording surface of a disc in its radial direction.

The aforementioned elevator mechanism moves a tray accommodating a disc, on which information is to be reproduced or recorded, to be flush with the pickup mechanism 13 in height. Then, the pickup mechanism 13 pivots about the support shaft 12 towards the clamping portion of a disc placed in the tray to sandwich the disc with the clamping mechanism 15. Thereafter, the optical pickup PU is controlled while the sandwiched disc is being rotated at the predetermined linear speed, thereby making it possible to record or reproduce information thereon or therefrom.

As shown in FIGS. 2, and 3A and 3B, the pickup mechanism 13 pivots towards the back of the information recording/reproducing device 1 to stay and wait there when no information is reproduced or recorded, i.e., when the information recording medium conveyer 3 performs the loading or unloading operation and when the elevator mechanism moves trays.

As shown in FIG. 2, at the other end portion of the arm portion 14 of the pickup mechanism 13, there is also provided a loading detection sensor 16, formed of an optical sensor or a mechanical microswitch, for detecting the loading of discs into each of the trays 11a to 11f.

Additionally, at a predetermined position in the information recording/reproducing device 1, there is provided an electrical circuit board for controlling the operation of the information recording medium conveyer 3.

Figure 4:
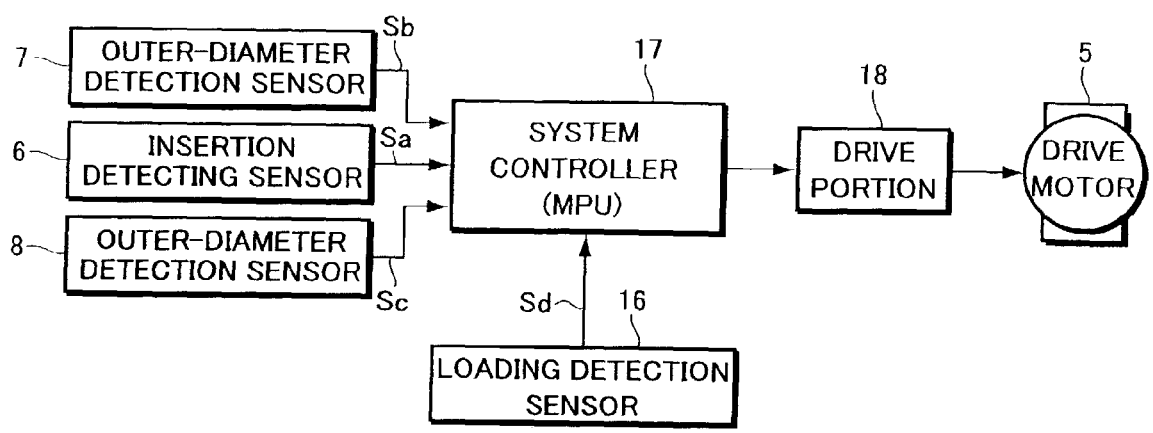
FIGS. 4A and 4B show a circuit for controlling the information recording medium conveyer according to the embodiment, and the positional relationship between each detection sensor and a conveying roller, respectively.
Figure 4:
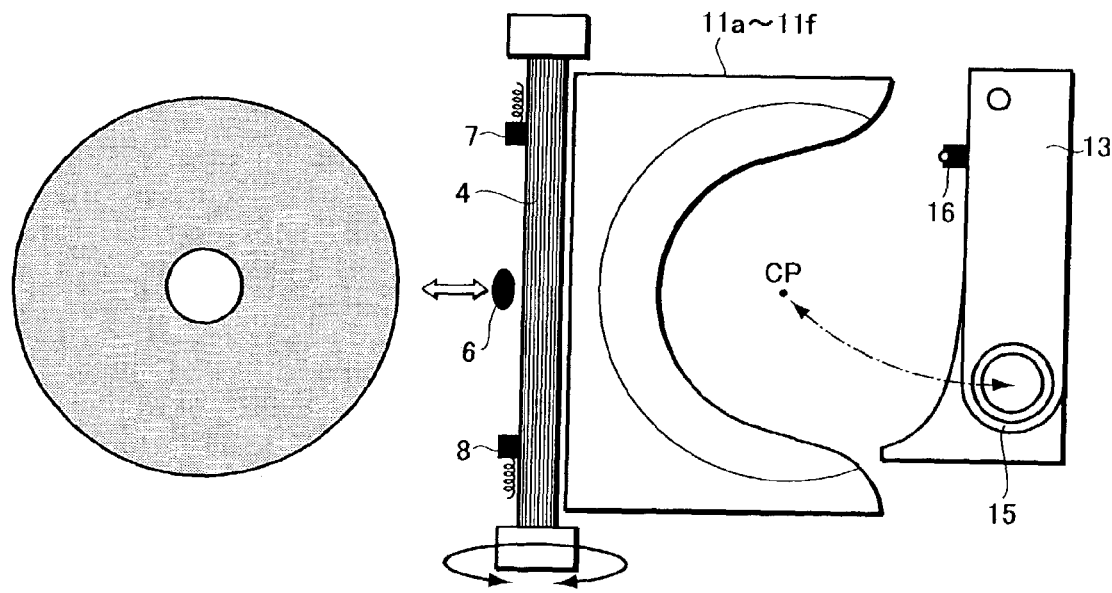

That is, as shown in the block diagram shown in FIG. 4A, the electrical circuit board includes the system controller 17 having a microprocessor (MPU) for controlling the information recording/reproducing device 1 and the information recording medium conveyer 3, and a drive portion 18 for supplying drive power to the drive motor 5 in response to commands from the system controller 17.

The system controller 17 centrally provides control to sequentially receive each of detection signals Sa, Sb, Sc, and Sd output by the insertion detecting sensor 6, the outer-diameter detection sensors 7 and 8, and the loading detection sensor 16, and then execute a pre-programmed system program to thereby analyze changes in these detection signals Sa, Sb, Sc, and Sd. Then, the system controller 17 directs the drive portion 18 to control power supply to the drive motor 5, thereby allowing the conveying roller 4 to perform a proper conveying operation.

As described above, the configuration of the information recording/reproducing device 1 and the information recording medium conveyer 3 is summarized as follows. That is, as shown in the plan view shown in FIG. 4B, the conveying roller 4 serving as transport device is disposed orthogonal to the loading and unloading direction, while the insertion detecting sensor 6 serving as the first detecting device and the outer-diameter detection sensors 7 and 8 serving as the second detecting device are disposed along the conveying roller 4.

The disc changer mechanism having a plurality of trays 11a to 11f is provided behind the conveying roller 4 in the loading direction, while the pivotable pickup mechanism 13 is provided behind the disc changer mechanism.

To record or reproduce information on the discs placed in the trays 11a to 11f, the pickup mechanism 13 pivots to allow the clamping mechanism 15 to sandwich the clamping portion CP of the disc and rotate it, thereby allowing the optical pickup PU to record or reproduce information thereon.

Now, the operation of the information recording medium conveyer 3 will be explained below with reference to FIGS. 5A to 10H.

FIGS. 5A to 8D are views showing the operation performed when a power interruption has occurred during a loading operation, FIGS. 9, and 10A to 10H being explanatory views showing the operation performed when a power interruption has occurred during an unloading operation.

First, the operation performed when a power interruption has occurred during a loading operation is explained below.

FIGS. 5A to 5F are views showing the loading operation properly carried out without any power interruption, showing the positional relationship between a large disc DSC or an adaptable disc ADP and the insert and outer-diameter detection sensor 6, 7, and 8, and the changes in detection signals Sa and Sb (Sc) output from the insertion detecting sensor 6 and the outer-diameter detection sensors 7 and 8, respectively. Referring to FIGS. 5A to 5F, a portion of the large-diameter circle indicated by reference symbol "A" represents the outer circumference portion of a disc DSC or ADP, while a portion of the small-diameter circle indicated by reference symbol "B" represents the inner circumference portion of the aforementioned clamping hole.

Referring to FIGS. 5A to 5F, a disc DSC or ADP inserted through the insertion hole 2 causes the insertion detecting sensor 6 to detect the leading edge of the disc face on the outer circumference portion A of the disc DSC or ADP as shown in FIG. 5A, thereby allowing the conveying roller 4 to rotate in the forward direction initiating a loading operation.

This allows the disc DSC or ADP to move in the loading direction in sequence as shown in FIGS. 5A to 5F, the movement causing the insertion detecting sensor 6 and the outer-diameter detection sensors 7 and 8 to output detection signals Sa and Sb (Sc) as shown in FIG. 5G, respectively.

The system controller 17 receives each of the detection signals Sa and Sb (Sc) delivered as such. If each of the detection signals Sa and Sb (Sc) from the respective detection sensors 6, 7, and 8 varies in accordance with the sequence shown in FIG. 5G, the system controller 17 determines that an authorized disc DSC or ADP is being normally loaded, and finally loaded into one of the trays in the disc changer mechanism.

Now, with reference to the flowchart shown in FIG. 6, the operation of the information recording medium conveyer 3 will be explained in detail.

Figure 6:
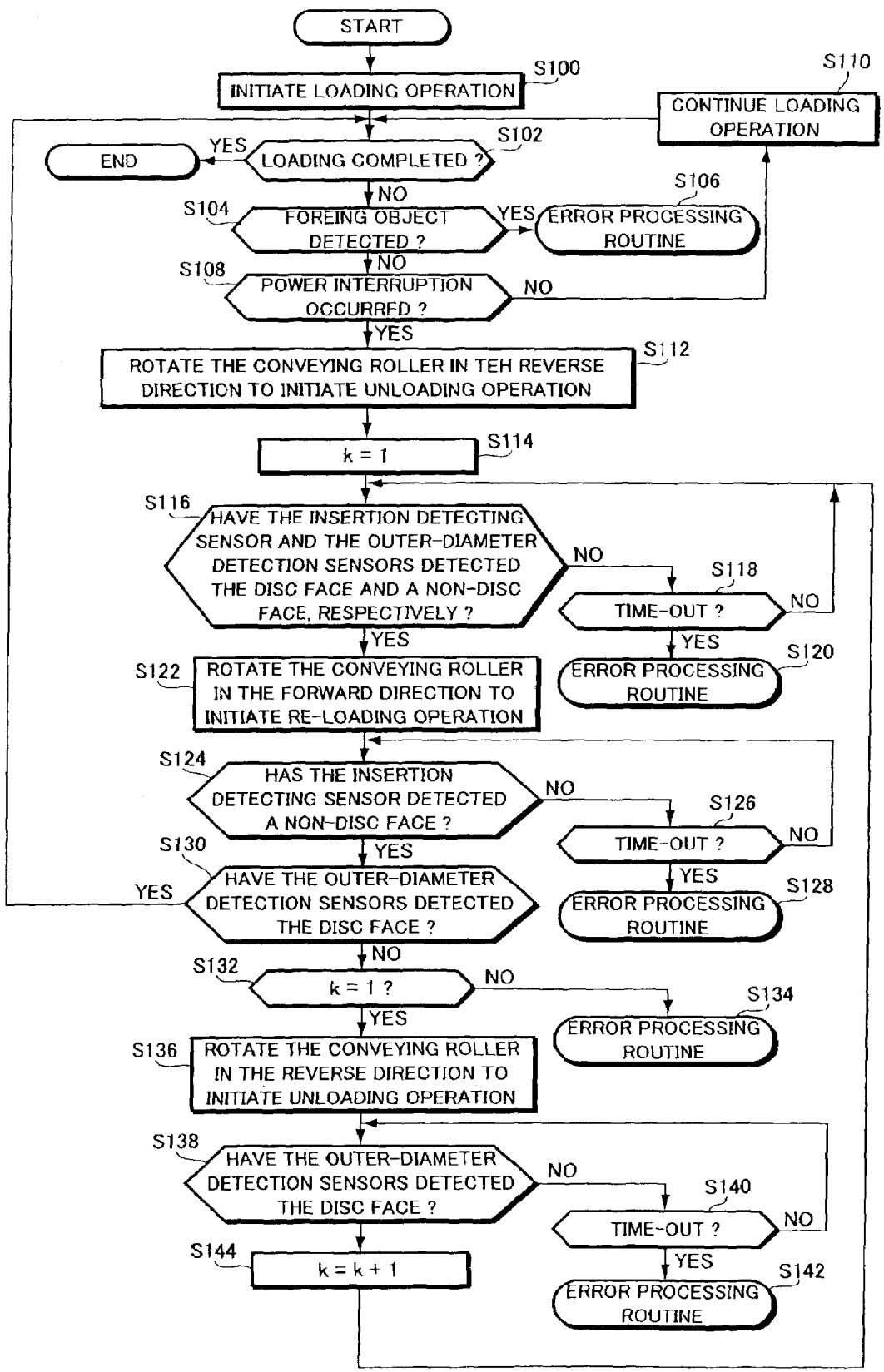
FIG. 6 is an explanatory view showing a flowchart of a loading operation.

Referring to FIG. 6, a user inserts a desired large disc DSC or adaptable disc ADP through the insertion hole 2. This causes the insertion detecting sensor 6 to detect the leading edge of the disc face of the disc DSC or ADP and the system controller 17 to rotate the conveying roller 4 in the forward direction, thereby initiating a loading operation (step S100).

This allows the loading operation to be initiated and continued under the control of the system controller 17. In step S102, when the loading detection sensor 16 is turned ON, the system controller 17 determines that the disc DSC or ADP has been loaded into a tray, and ends the loading operation.

When the disc DSC or ADP has not yet been loaded into the tray, the system controller determines in step S104 whether a foreign object has been detected. If it is determined that a foreign object has been detected, the process proceeds to step S106, where an error processing routine is executed to forcedly rotate the conveying roller 4 in the reverse direction and thereby eject the foreign object, then putting an end to the operation.

If the loading operation is continued without having detected a foreign object, the process determines in step S108 whether a power interruption has occurred. If no power interruption has occurred, the process continues the loading operation through step S110 to repeat the processing from step S102.

As shown in FIGS. 5A to 5F, if no foreign object has been detected and no power interruption has occurred, the disc DSC or ADP moves in a predetermined positional relationship with each of the detection sensors 6, 7, and 8. At the same time, the detection signals Sa and Sb (Sc) will vary in accordance with the normal sequence shown in FIG. 5G, thereby allowing the loading operation to be normally carried out under the control of the system controller 17.

To detect a power interruption, it is possible to employ a known technique by which, for example, the system controller 17 successively checks the output voltage of a power source to determine that a power interruption has occurred when the output voltage is found lower than a rated value.

When it is determined in step S108 described above that a power interruption has occurred, the system controller 17 proceeds to power interruption processing after step S112.

When such a power interruption has occurred, the disc DSC or ADP is found at that point in time ta at any one of the positions shown in FIGS. 7A to 7D relative to the insertion detecting sensor 6 and the outer-diameter detection sensors 7 and 8.

That is, FIG. 7A shows a case where since a power interruption has occurred immediately after a disc DSC or ADP has been inserted and the conveying roller 4 has started a loading operation, the outer-diameter detection sensors 7 and 8 have not yet detected the disc face of the disc DSC or ADP but a non-disc face.

FIG. 7B shows a case of a power interruption having occurred in a later stage of the loading operation than that of the case shown in FIG. 7A, in which the outer-diameter detection sensors 7 and 8 have detected an area Farea of the disc face of the disc DSC or ADP.

FIG. 7C shows a case of a power interruption having occurred in a later stage of the loading operation than that of the case shown in FIG. 7B, in which the outer-diameter detection sensors 7 and 8 have detected a non-disc face.

FIG. 7D shows a case of a power interruption having occurred in a later stage of the loading operation than that of the case shown in FIG. 7C and substantially immediately before loading, in which both the insertion detecting sensor 6 and the outer-diameter detection sensors 7 and 8 have detected a non-disc face.

In step S112, when a power interruption occurs in any one of the situations described above, the process forcedly rotates the conveying roller 4 in the reverse direction to initiate an unloading operation.

At the same time, in step S114, the process sets "1" to history data k, which is in turn stored in a memory area (not shown) within the system controller 17 as history information indicative of starting the processing from step S116 for the first time.

Then, in step S116, the process determines whether the insertion detecting sensor 6 has detected the disc face of the disc DSC or ADP being unloaded and the outer-diameter detection sensors 7 and 8 have detected a portion other than the disc face of the disc DSC or ADP (a non-disc face).

In other words, the process checks the logic level of each of the detection signals Sa and Sb (Sc) one by one during the unloading operation to determine whether the detection signal Sa takes on the logic "H" and the detection signals Sb and Sc take on the logic "H."

The process then repeats the determination processing in step S116 through the time-out determination processing in step S118 until the determination condition in step S116 is satisfied. When the aforementioned determination condition is satisfied within a certain period of time, the process temporarily stops the conveying roller 4 and then proceeds from step S116 to step S122.

If the aforementioned determination condition is not satisfied within a certain period of time, the process determines in step S118 that a time-out has occurred and then proceeds to the error processing routine in step S120, where the forced eject processing is carried out, and then put an end to the operation.

For example, when a power interruption occurs with a foreign object having been inserted, the error processing routine is carried out in step S120 to forcedly eject the foreign object. On the other hand, when a power interruption occurs with an authorized disc DSC or ADP having been inserted and subsequently some error occurs, the error processing routine is performed to prevent unnecessary troubles.

As described above, when the determination processing in step S116 is carried out within the period of time-out, the positional relationship between the disc DSC or ADP and each of the detection sensors 6, 7, and 8 changes from the states shown in FIGS. 7A to 7D to those shown in FIGS. 7E to 7H.

That is, suppose that a power interruption occurs at the point in time ta in FIG. 7A and the unloading operation is initiated in step S112. In this case, since the positional relationship between the disc DSC or ADP and each of the detection sensors 6, 7, and 8 has already satisfied the determination condition in step S116, the conveying roller 4 stops immediately after the unloading operation (substantially remains almost stopped), providing their positional relationship as shown in FIG. 7E at the stop point in time tb.

When a power interruption occurs at the point in time ta as shown in FIG. 7B and an unloading operation is initiated in step S112, the positional relationship is as shown in FIG. 7F at the stop point in time tb.

Suppose that a power interruption occurs at the point in time ta as shown in FIG. 7C and an unloading operation is initiated in step S112. In this case, since the positional relationship between the disc DSC or ADP and each of the detection sensors 6, 7, and 8 has already satisfied the determination condition in step S116, the conveying roller 4 stops immediately after the unloading operation (substantially remains almost stopped), providing their positional relationship as shown in FIG. 7G at the stop point in time tb.

When a power interruption occurs at the point in time ta as shown in FIG. 7D and an unloading operation is initiated in step S112, the positional relationship is one as shown in FIG. 7H at the stop point in time tb.

As described above, when the positional relationship takes any one of the states shown in FIGS. 7E to 7H and all the detection signals Sa, Sb, and Sc take on the logic "H," the system controller 17 determines that the positional relationship has returned to one between the points in time t1 and t2 in FIG. 5G. Then, the process is initialized in order to carry out an unloading operation, and then rotates the conveying roller 4 again in the forward direction in step S122 to initiate a re-loading operation.

Then, in step S124 where the re-loading operation is being continued, the process determines in accordance with the detection signal Sa whether the insertion detecting sensor 6 has detected a non-disc face. If the non-disc face has been detected, the process proceeds to step S130.

In this case, the process repeats the determination processing in step S124 through the time-out determination processing in step S126 until the determination condition in step S124 is satisfied. When the aforementioned determination condition is satisfied within a certain period of time, the process then proceeds to step S130.

However, if the aforementioned determination condition is not satisfied within a certain period of time, the process determines that a time-out has occurred in step S126 and then carries out the error processing routine in step S128, where the disc DSC or ADP being conveyed or a foreign object is forcedly ejected through the insertion hole 2, and then the operation is ended.

As described above, when the processing in step S124 is carried out within the period of time-out, the positional relationship between the disc DSC or ADP and each of the detection sensors 6, 7, and 8 changes from the states shown in FIGS. 7E and 7F to one shown in FIG. 8A and from the states shown in FIGS. 7G and 7H to one shown in FIG. 8B.

That is, suppose that a re-loading operation is initiated and continued in step S122 under the state shown in FIG. 7E or 7F. In this case, as shown in FIG. 8A, the insertion detecting sensor 6 detects the clamping hole (a non-disc face), thereby causing the detection signal Sa to take on the logic "H." When the detection signal Sa having the logic "H" is obtained in step S124, the process proceeds to step S130.

On the other hand, suppose that a re-loading operation is initiated and continued in step S122 under the state shown in FIG. 7G or 7H. In this case, as shown in FIG. 8B, the insertion detecting sensor 6 detects a portion other than the disc DSC or ADP (a non-disc face) to cause the detection signal Sa to take on the logic "H." Thus, the process proceeds to step S130.

In step S130, generally at the same time as point in time tc in the state shown in FIG. 8A or 8B, the process determines whether the outer-diameter detection sensors 7 and 8 have already detected the disc face of the disc DSC or ADP and their detection signals Sb and Sc have taken on the logic "L".

When the aforementioned determination condition is satisfied, the system controller 17 determines that the device has completely recovered from the power interruption. Then, the process returns to step S102 to continue the processing, thereby allowing the normal loading operation to continue.

That is, of the states shown in FIGS. 8A and 8B, the case shown in FIG. 8A satisfies the condition of step S130, in which the detection signals Sa, Sb, and Sc at this point in time tc are the same as at the point in time t3 in FIG. 5G.

Accordingly, suppose that the process has determined that the detection signals Sa, Sb, and Sc obtained upon initializing the process in step S116 as described above (as shown in FIG. 7E or 7F) are the same as at the point in time t2 in FIG. 5G, and in the subsequent step S130, the detection signals Sa, Sb, and Sc are the same as at the point in time t3 in FIG. 5G. In this case, the process determines that the device has completely recovered from the power interruption and then returns to step S102 to perform the normal loading operation and thus continue the processing.

Then, back in step S102, the process continues the normal loading operation (steps S102 to S110). When the normal sequence similar to the one after the point in time t3 in FIG. 5G is obtained, the process determines in step S102 that the disc has been completely loaded into a tray and then ends the loading operation.

On the other hand, in step S130, if the process determines that the outer-diameter detection sensors 7 and 8 have detected no disc face, the process proceeds to step S132. That is, in the case shown in FIG. 8B, the process proceeds to step S132 and then continues the power interruption processing.

First, in step S132, the process determines whether the history data k is set to "1." If k=1, the process then determines that the power interruption processing from step S116 to S130 has been performed once, and then proceeds to step S136. If the history data k is greater than or equal to "2," the process determines that an inevitable situation has occurred which cannot be restored to a normal condition even by repeatedly performing the power interruption processing, and then performs the error processing routine in step S134. Upon the error processing routine, the process rotates the conveying roller 4 in the reverse direction to carry out the eject processing, and then ends the operation.

In step S136, the process rotates the conveying roller 4 in the reverse direction to initiate an unloading operation, thereby unloading the disc DSC or ADP towards the insertion hole 2. That is, the process initiates the unloading operation starting from the state shown in FIG. 8B.

Then, in step S138 where the unloading operation is continued, the process determines in accordance with the detection signals Sb and Sc whether the outer-diameter detection sensors 7 and 8 have detected the disc face. That is, the process determines whether the state has been changed from FIG. 8B to FIG. 8C and the detection signals Sb and Sc have taken on the logic "H."

Upon this determination processing, the process repeats the determination processing through the time-out determination processing in step S140 until the determination condition in step S138 is satisfied. When it is determined in step S140 that a time-out has occurred, the process proceeds to the error processing routine in step S142, where the process rotates the conveying roller 4 in the reverse direction to perform the eject processing, and then ends the operation.

When the determination condition is satisfied in step S138 before the time-out occurs, the process proceeds to step S114, where "1" is added to the history data k and then the process returns to step S116 to repeat the aforementioned processing. That is, by setting "2" to the history data k, the process stores history information indicative of initiating the second processing starting from step S116 and then returns to step S116.

Back in step S116, the process determines whether the insertion detecting sensor 6 has detected the disc face and the outer-diameter detection sensors 7 and 8 have detected a non-disc face. If the determination condition is satisfied within a certain period of time-out, the process is initialized as described above and then proceeds to step S122, where the process rotates the conveying roller 4 again in the forward direction to initiate a re-loading operation.

As described above, when the determination condition is satisfied in step S116, the disc DSC or ADP has the positional relationship as shown in FIG. 8D, which is similar to that shown in FIG. 7E or 7F, allowing the system controller 17 to initialize the process as described above.

Accordingly, the point in time te for the positional relationship shown in FIG. 8D corresponds to the point in time t2 in FIG. 5G, thereby allowing the process to be initialized properly.

When each of the detection signals Sa, Sb, and Sc changes in accordance with the same normal sequence as that from the point in time t2 in FIG. 5G while the re-loading operation from step S122 is continued, the process returns to step S102 through step S130, and then performs the normal loading operation (from steps S102 to S110). Then, when the disc DSC or ADP is finally loaded into a tray, the process detects the loading in step S102 and then ends the loading operation.

However, if the determination condition is not satisfied in step S130, the process proceeds to step S132 to check the history data k. If it is determined that "2" is set at the data k, the process performs the error processing routine in step S134 and then ends the operation.

That is, as described above, if the disc DSC or ADP cannot be properly loaded even after the processing from step S116 to S130 has been performed twice, the process determines that an inevitable situation has occurred, and then performs the error processing routine in step S134 to carry out the forced eject operation and then ends the operation.

As described above, according to this embodiment, it is possible to provide a highly reliable information recording medium conveyer which allows its loading operation to positively return to a proper step even when a power interruption occurs during a loading operation of a large disc DSC or an adaptable disc ADP, thereby causing upon a power interruption the large disc DSC or the adaptable disc ADP to be located at any positions relative to the insertion detecting sensor 6 and the outer-diameter detection sensors 7 and 8.

In particular, suppose that a power interruption occurs in the state as shown in FIG. 15A, which has been described as a prior art problem. Even in this case, the processing from steps S132 to S144 is performed after the processing from steps S116 to S130 as described with reference to the flowchart shown in FIG. 6 and then the processing in step S116 is repeated, thereby enabling the process to be initialized and return to the normal sequence.

Accordingly, it is possible to provide an information recording medium conveyer capable of taking further improved countermeasures against power interruptions when compared with the conventional information recording medium conveyer.

Furthermore, when a foreign object is inserted and a power interruption occurs while the foreign object is being loaded, it is possible to perform predetermined error processing routine after the device has recovered from the power interruption, thereby ejecting the foreign object.

Now, with reference to FIGS. 9, and 10A to 10H, the operation performed when a power interruption occurs during an unloading operation is described below.

Figure 9:
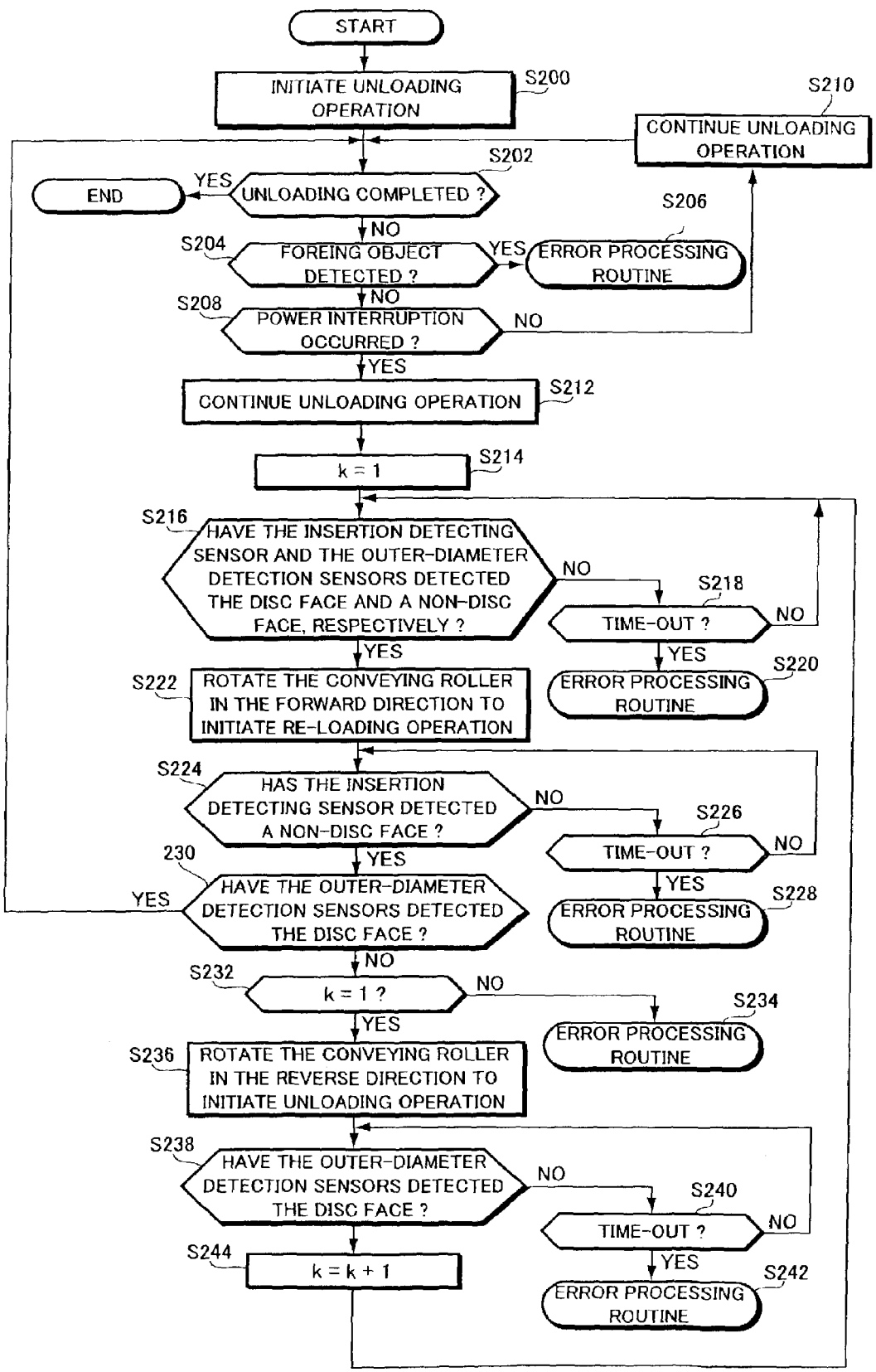
FIG. 9 is an explanatory view showing a flowchart of an unloading operation.

Referring to FIG. 9, a user begins an unloading operation by sending a start command to the system controller. The system controller, upon receipt of the start command, causes the disc changer mechanism to move the tray specified by the user to the conveying roller 4, allowing the disc DSC or ADP accommodated in the tray to be unclamped and released towards the conveying roller 4.

In step S200, the process allows the conveying roller 4 to rotate in the reverse direction, thereby starting to unload the disc DSC or ADP.

This allows the normal unloading operation to be carried out in the reverse order to the one shown in FIGS. 5A to 5F, or starting from the state shown in FIG. 5F followed by FIGS. 5E, 5D, 5C, 5B, and 5A, while the detection signals Sa and Sb (Sc) shown in FIG. 5G change in the reverse sequence or from the point in time t6 to the point in time t1.

Suppose that the normal unloading processing from steps S202 to S210 is continued through step S210, in the case of which no foreign object is detected in step S204, the error processing routine or an emergency eject operation is not performed in step S206, and no power interruption occurs in step S208. In this case, generally at the same point in time as that shown in FIG. 5A, the process stops the conveying roller 4 temporarily, thereby temporarily stopping the disc DSC or ADP remaining protruded from the insertion hole. That is, the process stops the conveying roller 4 temporarily with the trailing edge of the disc DSC or ADP sandwiched between the roller surface and the guide member 9, thereby preventing the disc DSC or ADP from being released or dislodged from the insertion hole.

While being stopped temporarily, the user can pull the disc DSC or ADP out of the insertion hole 2, thereby causing the detection signal Sa from the insertion detecting sensor 6 to change from the logic "H" to logic "L." The system controller 17 detects this change in the detection signal Sa in step S202, thereby finally ending the unloading operation.

When a power interruption occurs during the aforementioned unloading operation, the process detects the power interruption in step S208 and then proceeds to the power interruption processing from step S212.

In this case, the power interruption occurs when the disc DSC or ADP is located relative to the insertion detecting sensor 6 and the outer-diameter detection sensors 7 and 8 at any one of the positions as shown in FIGS. 10A, 10B, 10C, and 10D.

That is, FIG. 10A shows a case where since a power interruption has occurred immediately after an unloading operation has been started, all the detection sensors 6, 7, and 8 have not yet detected the disc face of the disc DSC or ADP but only a non-disc face.

FIG. 10B shows a case of a power interruption having occurred in a later stage of the unloading operation than that of the case shown in FIG. 10A, in which only the insertion detecting sensor 6 has detected the leading edge (the disc face) of the disc DSC or ADP.

FIG. 10C shows a case of a power interruption having occurred in a later stage of the unloading operation than that of the case shown in FIG. 10B, in which the outer-diameter detection sensors 7 and 8 have detected the area Farea of the disc face of the disc DSC or ADP.

FIG. 10D shows a case of a power interruption having occurred in a later stage of the unloading operation than that of the case shown in FIG. 10C, in which only the insertion detecting sensor 6 has detected the trailing edge (the disc face) of the disc DSC or ADP.

In step S212 that follows, when a power interruption occurs in any one of the situations described above, the process allows the unloading operation to be continued. At the same time, in step S214, the process sets "1" to history data k, which is in turn stored in a memory area (not shown) within the system controller 17 as history information indicative of starting the power interruption processing from step S216 for the first time.

Then, in step S216, the process determines whether the insertion detecting sensor 6 has detected the disc face of the disc DSC or ADP being unloaded and the outer-diameter detection sensors 7 and 8 have detected a portion other than the disc face of the disc DSC or ADP (a non-disc face).

In other words, the process checks the logic level of each of the detection signals Sa and Sb (Sc) one by one during the unloading operation to determine whether the detection signal Sa takes on the logic "H" and the detection signals Sb and Sc take on the logic "H."

The process then repeats the determination processing in step S216 through the time-out determination processing in step S218 until the determination condition in step S216 is satisfied. When the aforementioned determination condition is satisfied within a certain period of time, the process temporarily stops the conveying roller 4 and then proceeds from step S216 to step S222.

If the aforementioned determination condition is not satisfied within a certain period of time, the process determines in step S218 that a time-out has occurred and then proceeds to the error processing routine in step S220, where the forced eject processing is carried out, and then puts an end to the operation.

For example, when a power interruption occurs upon unloading a foreign object, the error processing routine is carried out in step S220 to forcedly eject the foreign object. On the other hand, when a power interruption occurs upon unloading an authorized disc DSC or ADP and subsequently some error occurs, the error processing routine is performed to prevent unnecessary troubles.

As described above, when the determination processing in step S216 is carried out within the period of time-out, the positional relationship between the disc DSC or ADP and each of the detection sensors 6, 7, and 8 changes from the states shown in FIGS. 10A to 10D to those shown in FIGS. 10E to 10H.

That is, suppose that a power interruption occurs at the state shown in FIG. 11A and the unloading operation is continued. In this case, the process stops the conveying roller 4 temporarily at the point in time at which the positional relationship is achieved as shown in FIG. 10E.

Suppose that a power interruption occurs at the state shown in FIG. 10B and the unloading operation is continued. In this case, since the positional relationship between the disc DSC or ADP and each of the detection sensors 6, 7, and 8 has already satisfied the determination condition in step S216, the conveying roller 4 is stopped immediately after the occurrence of the power interruption, thereby providing their positional relationship as shown in FIG. 10F.

When a power interruption occurs in the state as shown in FIG. 10C and the unloading operation is continued, the process stops the conveying roller 4 at the point in time at which the positional relationship is achieved as shown in FIG. 10G.

Suppose that a power interruption occurs in the state as shown in FIG. 10D and the unloading operation is continued. In this case, since the positional relationship between the disc DSC or ADP and each of the detection sensors 6, 7, and 8 has already satisfied the determination condition in step S216, the conveying roller 4 is stopped immediately after the occurrence of the power interruption, thereby providing their positional relationship as shown in FIG. 10H.

As described above, when the positional relationship takes any one of the states shown in FIGS. 10E to 10H and all the detection signals Sa, Sb, and Sc take on the logic "H," the system controller 17 determines that the positional relationship has returned to one between the points in time t1 and t2 in FIG. 5G.

Then, the process is initialized in order to change the processing from an unloading operation to a loading operation, and then rotates the conveying roller 4 in the forward direction in step S222 to initiate a loading operation and as well performs the processing in steps S224 to S244 in response to the change in the detection signals Sa and Sb (Sc).

The processing from steps S224 to S244 is the same as that from steps S124 to S144 shown in FIG. 6, and will not be discussed here in detail.

However, the process performs the processing from steps S224 to S244 in response to the change in the detection signals Sa and Sb (Sc) and then returns from step S244 to step S216 to continue the processing. Then, in step S230, the process determines whether the outer-diameter detection sensors 7 and 8 have detected a non-disc face of the disc DSC or ADP.

If a non-disc face of the disc DSC or ADP has been detected, the process returns from step S230 to step S202 to initiate an unloading operation.

That is, the processing is continued until the outer-diameter detection sensors 7 and 8 are determined in step S230 to have detected a non-disc face of the disc DSC or ADP. In this case, the positional relationship between the disc DSC or ADP and each of the detection sensors 6, 7, and 8 changes from one of the states shown in FIGS. 10E to 10H to the same state as the one shown in FIGS. 8A or 8B, at the point in time of which the process proceeds to the processing in step S202.

Upon returning from the unloading processing in step S202, the process performs the normal unloading processing (steps S204 to S210). When the unloading operation is completed in step S202 as described above, the process ends the unloading operation.

As described above, according to this embodiment, it is possible to provide a highly reliable information recording medium conveyer which allows its unloading operation to positively return to a proper step even when a power interruption occurs during an unloading operation of a large disc or an adaptable disc ADP, thereby causing upon a power interruption the large disc DSC or the adaptable disc ADP to be located at any positions relative to the insertion detecting sensor 6 and the outer-diameter detection sensors 7 and 8.

Accordingly, it is possible to provide an information recording medium conveyer capable of taking further improved countermeasures against power interruptions when compared with the conventional information recording medium conveyer.

Furthermore, even when a power interruption occurs during an unloading operation and subsequently some problem occurs during its restoring operation, the error processing routine is performed from steps S220, S228, and S242, there by making it possible to prevent unnecessary troubles.

In the embodiment described above, a large disc DSC or an adaptable disc ADP is in sliding contact with the outer-diameter detection sensors 7 and 8 formed of a microswitch to thereby sense the travel track of its outer circumference portion, however, the present invention is not limited to such an arrangement. As a modified example, instead of the aforementioned microswitch, an optical photo-sensor having a light-receiving device and a light-emitting device may also be employed to sense a travel track on the disc face of the outer circumference portion of a large disc DSC or an adaptable disc ADP in no contact therewith.

This embodiment is configured such that the transport device is driven by the conveying roller 4 being rotated to sandwich a disc, however, the present invention is not limited to such an arrangement. What is essential is that the transport device is capable of conveying a large disc DSC or an adaptable disc ADP.

As shown in FIG. 4B, this embodiment is configured such that the insertion detecting sensor 6 and the outer-diameter detection sensors 7 and 8 are disposed substantially in a line orthogonal to the loading and unloading direction to detect the passage of discs. However, the present invention is not limited to the case where the detection sensors 6, 7, and 8 are disposed substantially in a line orthogonal to the loading and unloading direction.

What is essential is that each of the detection sensors 6, 7, and 8 is disposed so as to cause each of the detection signals Sa, Sb, and Sc to change in accordance with the phase relationship as shown in FIG. 5G when a loading or an unloading operation is normally carried out.

That is, as shown in FIG. 5G, each of the detection sensors 6, 7, and 8 should be disposed such that each of the detection signals Sa, Sb, and Sc has the logic "L," "H," and "H," respectively, upon performing a loading operation when a disc has not yet been inserted into the insertion hole 2, while each of the detection signals changes in accordance with the normal sequence as shown in FIG. 5G after a disc has been inserted at the point in time t1.

On the other hand, each of the detection sensors 6, 7, and 8 should be disposed such that each of the detection signals Sa, Sb, and Sc has the logic "L," "H," and "H," respectively, upon performing an unloading operation when a disc has not yet been supplied from the tray side, while each of the detection signals changes in accordance with the reverse sequence to the one shown in FIG. 5G after a disc has been supplied from the tray side at the point in time t6.

If the phase of the detection signals Sa, Sb, and Sc changes as shown in FIG. 5G, each of the detection sensors 6, 7, and 8 does not need to be disposed such that the period of being at the logic "H" or "L" is the same as the one shown in FIG. 5G.

Figure 11:
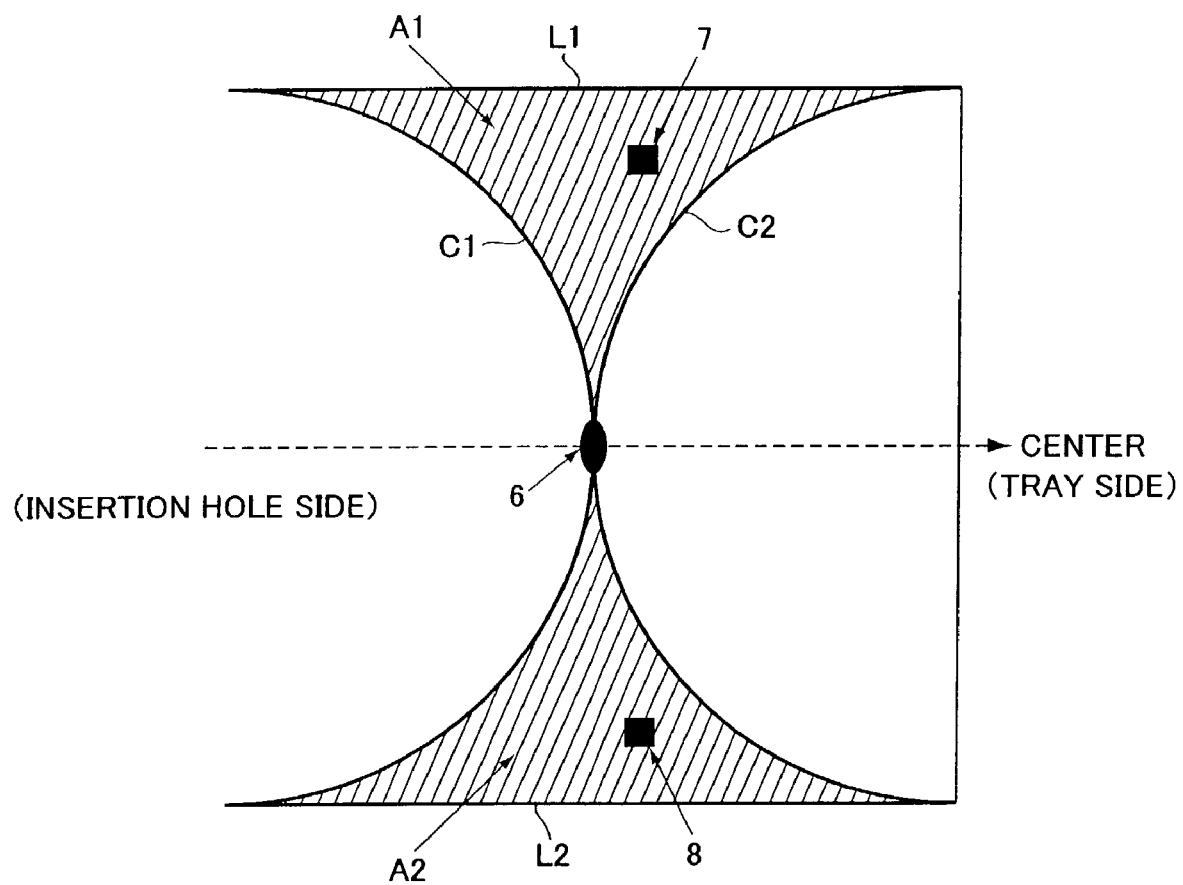
FIG. 11 is a view showing the positional relationship between an insertion detecting sensor and outer-diameter detection sensors.
Figure 14:
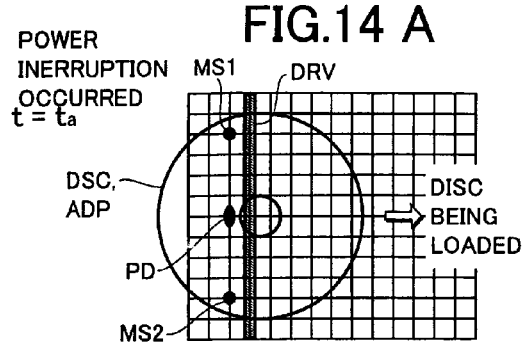
FIGS. 14A to 14F show, in explanatory views, the operation of the conventional information recording medium conveyer performed upon occurrence of a power interruption.
Figure 14:
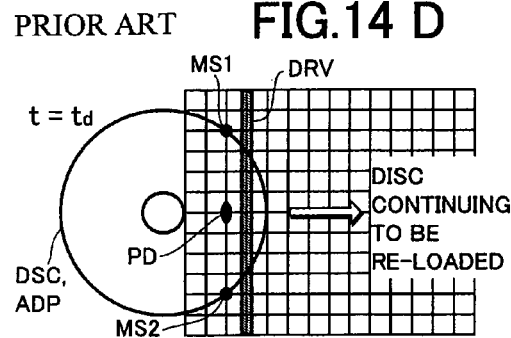
Figure 14:
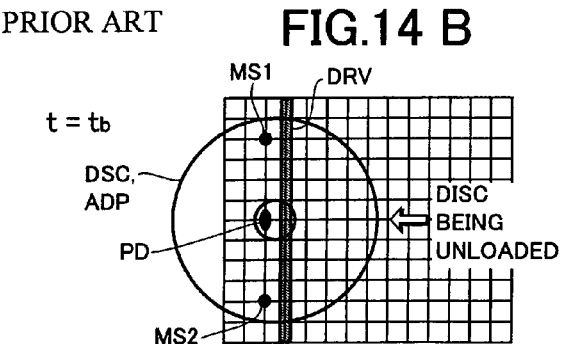
Figure 14:
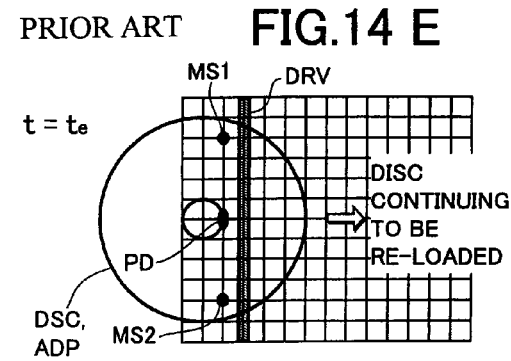
Figure 14:
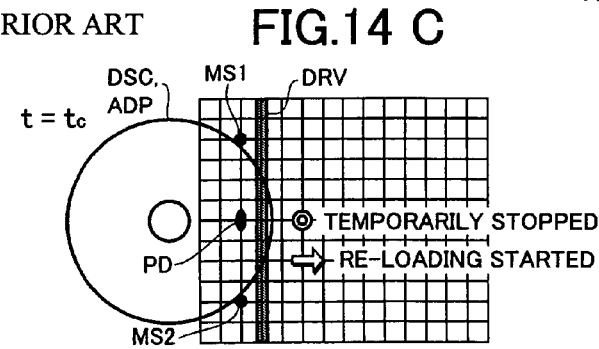
Figure 14:
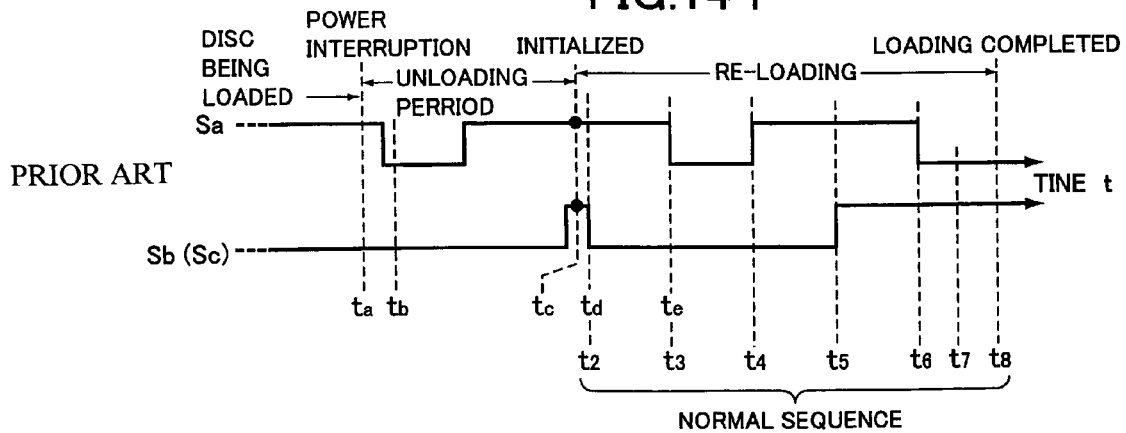

With reference to FIG. 11, the arrangement of each of the detection sensors 6, 7, and 8 which satisfies such a condition shows that the outer-diameter detection sensors 7 and 8 can be disposed at equidistant positions from the insertion detecting sensor 6 and within the regions diagonally shaded in FIG. 11.

That is, the insertion detecting sensor 6 is disposed at a position corresponding to a tangent point X between circle segments C1 and C2 each corresponding to the outer circumference of a large disc having a diameter of about 12 cm. On the other hand, the outer-diameter detection sensors 7 and 8 are disposed at their respective equidistant positions from the insertion detecting sensor 6 within the ranges A1 and A2 (the areas diagonally shaded) defined by the circle segments C1 and C2 and straight lines L1 and L2 tangent to the circle segments C1 and C2, respectively. This arrangement may then allow the insertion detecting sensor 6 to sense a travel track on the center axis line of a disc being conveyed.

The detection signals Sa, Sb, and Sc may also be adapted to take on the reverse logic values to those shown in FIG. 5G. That is, each of the detection sensors 6, 7, and 8 may be adapted to deliver the detection signals Sa, Sb, and Sc such that the logic levels shown in FIG. 5G take on the logic "L" instead of "H" and the logic "H" instead of "L."

Furthermore, in this embodiment, the two outer-diameter detection sensors 7 and 8 detect the disc face of a disc DSC or ADP, however, the present invention may be provided with at least one outer-diameter detection sensor.

As described above, the information recording medium conveyer according to the present invention can realize highly reliable loading and unloading operations. This is achieved by configuring the apparatus such that when a power interruption occurs during a loading operation or an unloading operation, an information recording medium is conveyed so as to meet a predetermined initialization condition, and even when the situation does not still allow the process to be initialized, the information recording medium is conveyed so as to meet the condition again and the process is then initialized to perform the loading operation, thereby ensuring that the apparatus is recovered from the power interruption.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information recording medium conveyer for conveying a disc-shaped information recording medium, comprising:
   a transport device for conveying said information recording medium in both backward and forward directions;
   a first detecting device for detecting a travel track on a center axis line of said information recording medium conveyed by said transport device;
   a second detecting device for detecting a travel track of a portion separated by a predetermined distance from said center axis line of said information recording medium conveyed by said transport device; and
   a control device for initializing a loading operation performed by said transport device on a condition that an output of said first detecting device and said second detecting device provides a predetermined value and for causing the loading operation to continue when the output of said first and second detecting device changes in accordance with a predetermined sequence upon the loading operation after having been initialized, wherein said control device performs the steps of:
      allowing said transport device to initiate a first unloading operation when a power interruption occurs during a loading operation performed by said transport device,
      allowing said transport device to be initialized and initiate a re-loading operation when an output of said first and second detecting device satisfies said condition during said first unloading operation,
      allowing said re-loading operation to continue when the output of said first and second detecting device changes in accordance with said predetermined sequence during said re-loading operation,
      allowing a second unloading operation to be initiated when the output of said first and second detecting device does not change in accordance with said predetermined sequence during said re-loading operation,
      allowing said transport device to be initialized and initiate another loading operation when the output of said first and second detecting device satisfies said condition after said second detecting device has detected said information recording medium during said second unloading operation, and
      allowing said another loading operation to continue when the output of said first and second detecting device changes in accordance with said predetermined sequence during said another loading operation.

2. An information recording medium conveyer for conveying a disc-shaped information recording medium, comprising:
   a transport device for conveying said information recording medium in both backward and forward directions;
   a first detecting device for detecting a travel track on a center axis line of said information recording medium conveyed by said transport device;
   a second detecting device for detecting a travel track of a portion separated by a predetermined distance from said center axis line of said information recording medium conveyed by said transport device; and
   a control device for initializing an unloading operation performed by said transport device on a condition that an output of said first detecting device and said second detecting device provides a predetermined value and for causing the unloading operation to continue when the output of said first detecting device and said second detecting device changes in accordance with a predetermined sequence upon the unloading operation after having been initialized, wherein said control device performs the steps of:

allowing said transport device to continue the unloading operation when a power interruption occurs during the unloading operation performed by said transport device, allowing said transport device to be initialized and initiate a first loading operation when an output of said first and second detecting device satisfies said condition during said unloading operation, allowing said transport device to initiate a re-unloading operation when the output of said first and second detecting device changes in accordance with said predetermined sequence during said first loading operation, allowing an unloading operation to be initiated when the output of said first and second detecting device does not change in accordance with said predetermined sequence during said first loading operation, allowing said transport device to be initialized and initiate a second loading operation when the output of said first and second detecting device satisfies said condition during said unloading operation, allowing said transport device to initiate another unloading operation when the output of said first and second detecting device changes in accordance with said predetermined sequence during said second loading operation, and allowing said another unloading operation to continue when the output of said first and second detecting device changes in accordance with said predetermined sequence during said another unloading operation.

* * * * *